(12) United States Patent
Wan et al.

(10) Patent No.: US 12,115,862 B2
(45) Date of Patent: Oct. 15, 2024

(54) METHOD FOR BALANCING BATTERIES OF A VEHICLE, AND DEVICE, AND VEHICLE

(71) Applicant: BYD COMPANY LIMITED, Guangdong (CN)

(72) Inventors: Qiang Wan, Shenzhen (CN); Hao Lu, Shenzhen (CN); Lu Wang, Shenzhen (CN); Daolin Li, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 349 days.

(21) Appl. No.: 17/764,065

(22) PCT Filed: Sep. 23, 2020

(86) PCT No.: PCT/CN2020/117185
§ 371 (c)(1),
(2) Date: Mar. 25, 2022

(87) PCT Pub. No.: WO2021/057803
PCT Pub. Date: Apr. 1, 2021

(65) Prior Publication Data
US 2022/0388404 A1    Dec. 8, 2022

(30) Foreign Application Priority Data
Sep. 29, 2019  (CN) .......................... 201910930502.7

(51) Int. Cl.
*B60L 15/20* (2006.01)
(52) U.S. Cl.
CPC ....... *B60L 15/2045* (2013.01); *B60L 2240/26* (2013.01); *B60L 2240/423* (2013.01); *B60L 2240/54* (2013.01)

(58) Field of Classification Search
CPC ............. B60L 15/2045; B60L 2240/26; B60L 2240/423; B60L 2240/54
See application file for complete search history.

(56) References Cited

U.S. PATENT DOCUMENTS

| | | | |
|---|---|---|---|
| 2012/0330550 A1* | 12/2012 | Jensen | G09B 25/08 702/5 |
| 2014/0052318 A1* | 2/2014 | Yoshida | B60L 7/06 180/65.265 |
| 2021/0387525 A1* | 12/2021 | Gruenig | B60W 50/14 |

FOREIGN PATENT DOCUMENTS

| | | |
|---|---|---|
| CN | 103677060 A | 3/2014 |
| CN | 204197081 U | 3/2015 |

(Continued)

OTHER PUBLICATIONS

International Search Report and Written Opinion for Application No. PCT/CN2020/117185, mailed on Dec. 30, 2020, 10 pages.

*Primary Examiner* — Brian P Sweeney
*Assistant Examiner* — Steven Vu Nguyen

(57) ABSTRACT

A driving control method and apparatus for a vehicle, and a vehicle are provided, and relate to the field of vehicle control. The vehicle includes at least two carriages, and the driving control method includes the following steps: obtaining battery level information of a power battery corresponding to each of the carriages; obtaining at least one of a level allocated to each carriage or a payload allocated to each carriage according to the battery level information of the power battery corresponding to each carriage; and obtaining an output torque of each carriage according to the at least one of the level allocated to each carriage or the payload allocated to each carriage.

19 Claims, 7 Drawing Sheets

---

Obtain battery level information of a power battery corresponding to each of carriages, where the battery level information of the power battery corresponding to each carriage includes an SOC value of the power battery corresponding to each carriage — 601

Calculate a payload allocated to each carriage according to the SOC value of the power battery corresponding to each carriage and a current total payload of a vehicle — 602

(56) References Cited

FOREIGN PATENT DOCUMENTS

| | | |
|---|---|---|
| CN | 104960526 A | 10/2015 |
| CN | 106809013 A | 6/2017 |
| CN | 207481677 U | 6/2018 |
| CN | 108237950 A | 7/2018 |
| DE | 102017211978 A1 | 1/2019 |
| JP | 2013184584 A | 9/2013 |

\* cited by examiner

METHOD FOR BALANCING BATTERIES OF A VEHICLE, AND DEVICE, AND VEHICLE

CROSS-REFERENCE TO RELATED APPLICATIONS

This application is a National Phase Application of International Patent Application No. PCT/CN2020/117185, filed on Sep. 23, 2020, which is based on and claims priority to and benefits of Chinese Patent Application No. 201910930502.7, entitled "VEHICLE DRIVE CONTROL METHOD AND DEVICE, AND VEHICLE" and filed on Sep. 29, 2019. The entire content of all of the above-identified applications is incorporated herein by reference.

FIELD

The present disclosure relates to the field of vehicle control, and in particular, to a driving control method and apparatus for a vehicle, and a vehicle.

BACKGROUND

Currently, some vehicles, such as rail vehicles, and buses with a plurality of carriages are driven by electric power. Each carriage of such vehicles is equipped with a power battery and a motor controller and a drive motor connected to the power battery. The power battery supplies power to the motor controller and the drive motor, so as to meet driving requirements of the vehicle. However, after the vehicle runs for a long time, the electric levels of the power batteries of the carriages usually become imbalanced.

SUMMARY

The present disclosure provides a driving control method and apparatus for a vehicle, and a vehicle. The method can reasonably allocate at least one of a level or a payload of each carriage according to battery level information of a power battery corresponding to each carriage, and then control an output torque of each carriage. In this way, after the vehicle runs for a long time, a problem that a battery level of the vehicle is insufficient to meet driving requirements of the vehicle because battery levels of power batteries between different carriages are inconsistent, and a power battery with a lower battery level cannot provide an enough battery level to an apparatus in a corresponding carriage is effectively avoided.

An embodiment of a first aspect of the present disclosure proposes a driving control method for a vehicle, the vehicle including at least two carriages, and the driving control method including the following steps:

obtaining battery level information of a power battery corresponding to each carriage;

obtaining at least one of a level allocated to each carriage or a payload allocated to each carriage according to the battery level information of the power battery corresponding to each carriage; and obtaining an output torque of each carriage according to the at least one of the level allocated to each carriage or the payload allocated to each carriage.

The driving control method for a vehicle of this embodiment of the present disclosure reasonably allocates at least one of a level or a payload of each of carriages by obtaining battery level information of a power battery corresponding to each carriage, so that each carriage outputs a different torque. In other words, by adjusting battery level consumption of the power battery of each carriage, it is ensured that a battery level of the power battery of each carriage remains balanced.

An embodiment of a second aspect of the present disclosure proposes a driving control apparatus for a rail vehicle, the vehicle including at least two carriages, and the driving control apparatus for a vehicle including:

an acquisition unit, configured to obtain battery level information of a power battery corresponding to each carriage;

a calculation unit, configured to obtain at least one of a level allocated to each carriage or a payload allocated to each carriage according to the battery level information of the power battery corresponding to each carriage; and a control unit, configured to obtain an output torque of each carriage according to the at least one of the level allocated to each carriage or the payload allocated to each carriage.

The driving control apparatus for a vehicle of this embodiment of the present disclosure reasonably allocates at least one of a level or a payload of each of carriages by obtaining battery level information of a power battery corresponding to each carriage, so that each carriage outputs a different torque. In other words, by adjusting battery level consumption of the power battery of each carriage, it is ensured that a battery level of the power battery of each carriage remains balanced.

An embodiment of a third aspect of the present disclosure proposes a driving control apparatus for a vehicle, including a processor and a memory, the processor being configured to read an executable program code stored in the memory, and run a program corresponding to the executable program code, to implement the driving control method for a vehicle according to the foregoing aspects.

An embodiment of a fourth aspect of the present disclosure proposes a vehicle, including a driving control apparatus for a vehicle and at least two carriages, each of the carriages including: a power batter; a battery management system, connected to the power battery; a motor controller, connected to the power battery; and a drive motor, connected to the motor controller, where the driving control apparatus for a vehicle is respectively connected to the battery management system and the motor controller, and the driving control apparatus for a vehicle is the driving control apparatus for a vehicle according to the foregoing aspect.

The additional aspects and advantages of the present disclosure will be provided in the following description, some of which will become apparent from the following description or may be learned from practices of the present disclosure.

DETAILED DESCRIPTION

To make the technical problems to be solved by the present disclosure, technical solutions, and beneficial effects more comprehensible, the following further describes the present disclosure in detail with reference to the accompanying drawings and embodiments. It should be understood that, the specific embodiments described therein are merely used for explaining the present disclosure instead of limiting the present disclosure.

Currently, some vehicles, such as rail vehicles and buses with a plurality of carriages, are driven by electric power. Each carriage of such vehicles is equipped with a power battery and a motor controller and a drive motor connected to the power battery. The power battery supplies power to the motor controller and the drive motor, so as to meet driving requirements of the vehicle. After the vehicle runs for a long time, battery levels of power batteries in different carriages are inconsistent, and a power battery with a lower battery level cannot provide an enough battery level to an apparatus in a corresponding carriage, so that a battery level of the vehicle is insufficient to meet driving requirements of the vehicle. In view of the above technical problems, the present disclosure proposes a driving control method and apparatus for a vehicle, and a vehicle, which are specifically as follows:

Embodiment 1

Figure 1:
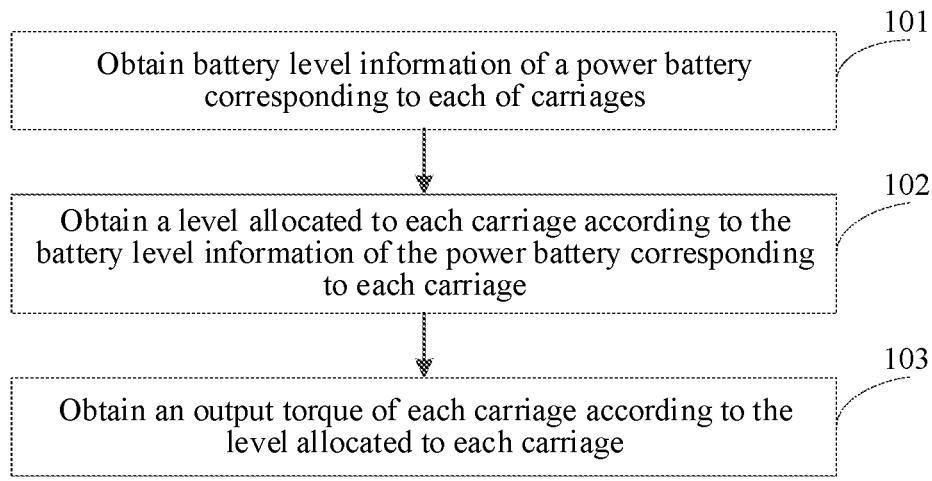
FIG. 1 is a schematic flowchart of a driving control method for a vehicle according to Embodiment 1 of the present disclosure.

FIG. 1 is a schematic flowchart of a driving control method for a vehicle according to Embodiment 1 of the present disclosure. As shown in FIG. 1, the driving control method for a vehicle includes the following steps:

Step 101. Obtain battery level information of a power battery corresponding to each of carriages.

In this embodiment of the present disclosure, the vehicle includes at least two carriages, and each carriage is provided with a power battery, and a motor controller and a drive motor are connected to the power battery. The battery level information of the power battery of each carriage may be acquired through a battery management system corresponding to the power battery, and be sent to the driving control apparatus for a vehicle. It is to be noted that, the battery level information of the power battery may include a value of a state of charge (SOC, a physical quantity used for reflecting remaining capacity of a power battery) of the power battery, or include a voltage, charging and discharging currents of the power battery, etc., but is not limited thereto.

Step 102. Obtain a level allocated to each carriage according to the battery level information of the power battery corresponding to each carriage.

In this embodiment of the present disclosure, the battery management system of each carriage messages with the driving control apparatus for a vehicle in real time, the battery management system of each carriage sends the acquired battery level information of the power battery to the driving control apparatus for a vehicle, and the driving control apparatus for a vehicle may recalculate the level allocated to each carriage according to the battery level information of the power battery of each carriage. As another possible implementation of this embodiment of the present disclosure, the driving control apparatus for a vehicle may obtain the level allocated to each carriage from a first preset query table according to the battery level information of the power battery of each carriage, where the first preset query table is established based on the battery level information of the power battery of each carriage and may be obtained through tests, an input of the first preset query table is the battery level information of the power battery of each carriage, and an output thereof is the level allocated to each carriage.

Step 103. Obtain an output torque of each carriage according to the level allocated to each carriage.

In this embodiment of the present disclosure, the driving control apparatus for a vehicle may send the level allocated to each carriage to the motor controller corresponding to each carriage through a vehicle network in real time, and the motor controller calculates the output torque of each carriage according to the level allocated to each carriage, and controls the drive motor to execute the output torque.

As a possible implementation of Embodiment 1 of the present disclosure, when the vehicle includes two carriages, that is, the vehicle includes a first carriage and a second carriage, and each carriage is provided with a power battery, and a motor controller and a drive motor connected to the power battery, during a running process of the vehicle, the driving control apparatus for a vehicle messages with battery management systems of the first carriage and the second carriage respectively in real time, to obtain battery level information of a power battery of the first carriage and battery level information of a power battery of the second carriage; and calculates a level allocated to the first carriage and a level allocated to the second carriage according to the battery level information of the power battery of the first carriage and the battery level information of the power battery of the second carriage. Then, the driving control apparatus for a vehicle sends the level allocated to the first carriage to a motor controller of the first carriage, and the motor controller of the first carriage may calculate an output torque of a drive motor of the first carriage according to the level allocated to the first carriage, and control the drive motor of the first carriage to execute the output torque. In addition, the driving control apparatus for a vehicle may also send the level allocated to the second carriage to a motor controller of the second carriage, and the motor controller of the second carriage may calculate an output torque of a drive motor of the second carriage according to the level allocated to the second carriage, and control the drive motor of the second carriage to execute the output torque.

In this embodiment of the present disclosure, battery level information of a power battery corresponding to each of carriages is obtained, so that different levels are allocated to different carriages, and then each carriage outputs a different torque. That is, after battery level information of power batteries of all carriages of a vehicle is mastered, a carriage with a high battery level or a low battery level is identified, and then a level is allocated to each carriage accordingly, to control each carriage to output a different torque. In other words, by adjusting battery level consumption of the power battery corresponding to each carriage, a battery level of the power battery corresponding to each carriage being the same or similar is finally achieved. In this way, after the vehicle runs for a long time, a problem that a battery level of the vehicle is insufficient to meet driving requirements of the vehicle because battery levels of power batteries in different carriages are inconsistent, and a power battery with a lower battery level cannot provide an enough battery level to an apparatus in a corresponding carriage is effectively avoided.

Embodiment 2

Figure 2:
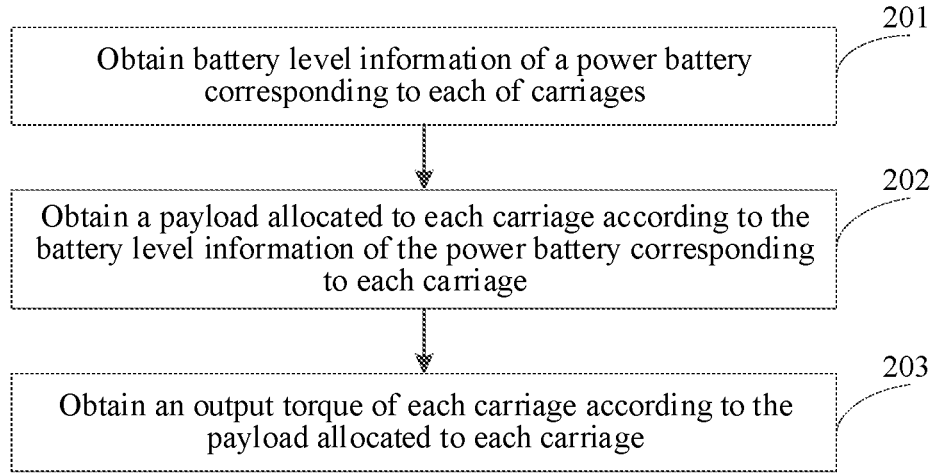
FIG. 2 is a schematic flowchart of a driving control method for a vehicle according to Embodiment 2 of the present disclosure.

FIG. 2 is a schematic flowchart of a driving control method for a vehicle according to Embodiment 2 of the present disclosure. As shown in FIG. 2, the driving control method for a vehicle includes the following steps:

Step 201. Obtain battery level information of a power battery corresponding to each of carriages.

In this embodiment of the present disclosure, the vehicle includes at least two carriages, and each carriage is provided with a power battery, and a motor controller and a drive motor connected to the power battery. The battery level information of the power battery of each carriage may be acquired through a battery management system corresponding to the power battery, and be sent to the driving control apparatus for a vehicle.

Step 202. Obtain a payload allocated to each carriage according to the battery level information of the power battery corresponding to each carriage.

In this embodiment of the present disclosure, the battery management system of each carriage messages with the driving control apparatus for a vehicle in real time, the battery management system of each carriage sends the acquired battery level information of the power battery to the driving control apparatus for a vehicle, and the driving control apparatus for a vehicle may recalculate the payload allocated to each carriage according to the information of the power battery of each carriage. As another possible implementation of this embodiment of the present disclosure, the driving control apparatus for a vehicle may obtain the payload allocated to each carriage from a second preset query table according to the battery level information of the power battery of each carriage, where the second preset query table is established based on the battery level information of the power battery of each carriage and may be obtained through tests, an input of the second preset query table is the battery level information of the power battery of each carriage, and an output thereof is the payload allocated to each carriage.

Step 203. Obtain an output torque of each carriage according to the payload allocated to each carriage.

In this embodiment of the present disclosure, the driving control apparatus for a vehicle may send the payload allocated to each carriage to the motor controller corresponding to each carriage through a vehicle network in real time, and the motor controller calculates the output torque of each carriage according to the payload allocated to each carriage, and controls the drive motor to execute the output torque.

As a possible implementation of Embodiment 2 of the present disclosure, when the vehicle includes two carriages, that is, the vehicle includes a first carriage and a second carriage, and each carriage is provided with a power battery, and a motor controller and a drive motor connected to the power battery, during a running process of the vehicle, the driving control apparatus for a vehicle messages with battery management systems of the first carriage and the second carriage respectively in real time, to obtain battery level information of a power battery of the first carriage and battery level information of a power battery of the second carriage; and calculates a payload allocated to the first carriage and a payload allocated to the second carriage according to the battery level information of the power battery of the first carriage and the battery level information of the power battery of the second carriage. Then, the driving control apparatus for a vehicle sends the payload allocated to the first carriage to a motor controller of the first carriage, and the motor controller of the first carriage may calculate an output torque of a drive motor of the first carriage according to the payload allocated to the first carriage, and control the drive motor of the first carriage to execute the output torque. In addition, the driving control apparatus for a vehicle may also send the payload allocated to the second carriage to a motor controller of the second carriage, and the motor controller of the second carriage may calculate an output torque of a drive motor of the second carriage according to the payload allocated to the second carriage, and control the drive motor of the second carriage to execute the output torque.

In this embodiment of the present disclosure, battery level information of a power battery corresponding to each of carriages is obtained, so that different payloads are allocated to different carriages, and then each carriage outputs a different torque. That is, after battery level information of power batteries of all carriages of a vehicle is mastered, a carriage with a high battery level or a low battery level is identified, and then a payload is allocated to each carriage accordingly, to control each carriage to output a different torque. In other words, by adjusting battery level consumption of the power battery corresponding to each carriage, a battery level of the power battery corresponding to each carriage being the same or similar is finally achieved. In this way, after the vehicle runs for a long time, a problem that a battery level of the vehicle is insufficient to meet driving requirements of the vehicle because battery levels of power batteries in different carriages are inconsistent, and a power battery with a lower battery level cannot provide an enough battery level to an apparatus in a corresponding carriage is effectively avoided.

Embodiment 3

Figure 3:
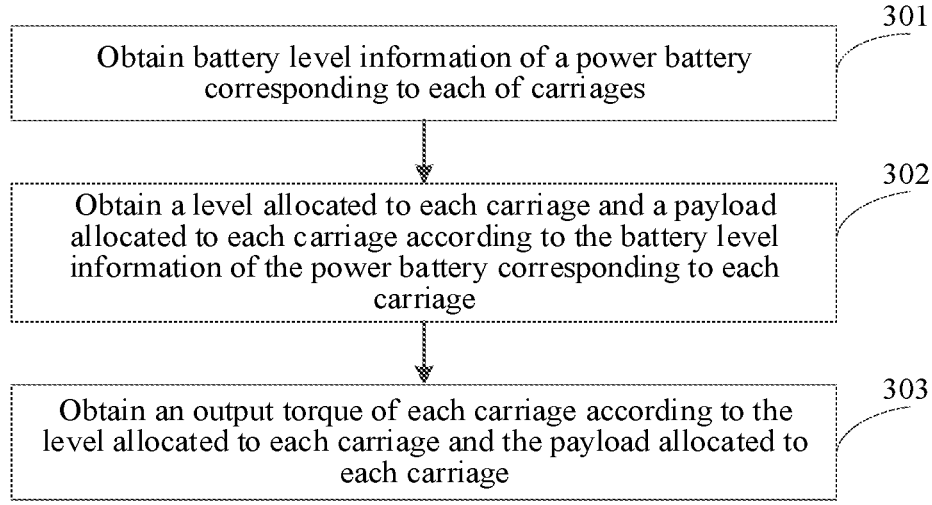
FIG. 3 is a schematic flowchart of a driving control method for a vehicle according to Embodiment 3 of the present disclosure.

FIG. 3 is a schematic flowchart of a driving control method for a vehicle according to Embodiment 3 of the present disclosure. As shown in FIG. 3, the driving control method for a vehicle includes the following steps:

Step 301. Obtain battery level information of a power battery corresponding to each of carriages.

In this embodiment of the present disclosure, the vehicle includes at least two carriages, and each carriage is provided with a power battery, and a motor controller and a drive motor connected to the power battery. The battery level information of the power battery of each carriage may be acquired through a battery management system corresponding to the power battery, and be sent to the driving control apparatus for a vehicle.

Step 302. Obtain a level allocated to each carriage and a payload allocated to each carriage according to the battery level information of the power battery corresponding to each carriage.

In this embodiment of the present disclosure, the battery management system of each carriage messages with the driving control apparatus for a vehicle in real time, the battery management system of each carriage sends the acquired battery level information of the power battery to the driving control apparatus for a vehicle, and the driving control apparatus for a vehicle may recalculate the level and the payload allocated to each carriage according to the information of the power battery of each carriage. As another possible implementation of this embodiment of the present disclosure, the driving control apparatus for a vehicle may obtain the payload and the level allocated to each carriage from a third preset query table according to the battery level information of the power battery of each carriage, where the third preset query table is established based on the battery level information of the power battery of each carriage and may be obtained through tests, an input of the third preset query table is the battery level information of the power battery of each carriage, and an output thereof is the payload and the level allocated to each carriage.

Step 303. Obtain an output torque of each carriage according to the level allocated to each carriage and the payload allocated to each carriage.

In this embodiment of the present disclosure, the driving control apparatus for a vehicle may send the payload and the level allocated to each carriage to the motor controller corresponding to each carriage through a vehicle network in real time, and the motor controller calculates the output torque of each carriage according to the payload and the level allocated to each carriage, and controls the drive motor to execute the output torque.

As a possible implementation of Embodiment 3 of the present disclosure, when the vehicle includes two carriages, that is, the vehicle includes a first carriage and a second carriage, and each carriage is provided with a power battery, and a motor controller and a drive motor connected to the power battery, during a running process of the vehicle, the driving control apparatus for a vehicle messages with battery management systems of the first carriage and the second carriage respectively in real time, to obtain battery level information of a power battery of the first carriage and battery level information of a power battery of the second carriage; and calculates a payload and a level allocated to the first carriage and a payload and a level allocated to the second carriage according to the battery level information of the power battery of the first carriage and the battery level information of the power battery of the second carriage. Then, the driving control apparatus for a vehicle sends the payload and the level allocated to the first carriage to a motor controller of the first carriage, and the motor controller of the first carriage may calculate an output torque of a drive motor of the first carriage according to the payload and the level allocated to the first carriage, and control the drive motor of the first carriage to execute the output torque. In addition, the driving control apparatus for a vehicle may also send the payload and the level allocated to the second carriage to a motor controller of the second carriage, and the motor controller of the second carriage may calculate an output torque of a drive motor of the second carriage according to the payload and the level allocated to the second carriage, and control the drive motor of the second carriage to execute the output torque.

In this embodiment of the present disclosure, battery level information of a power battery corresponding to each of carriages is obtained, so that different payloads and levels are allocated to different carriages, and then each carriage outputs a different torque. That is, after battery level information of power batteries of all carriages of a vehicle is mastered, a carriage with a high battery level or a low battery level is identified, and then a payload and a level is allocated to each carriage accordingly, to control each carriage to output a different torque. In other words, by adjusting battery level consumption of the power battery corresponding to each carriage, a battery level of the power battery corresponding to each carriage being the same or similar is finally achieved. In this way, after the vehicle runs for a long time, a problem that a battery level of the vehicle is insufficient to meet driving requirements of the vehicle because battery levels of power batteries in different carriages are inconsistent, and a power battery with a lower battery level cannot provide an enough battery level to an apparatus in a corresponding carriage is effectively avoided. In addition, the driving control method for a vehicle of this embodiment reallocates a level and a payload of each carriage, which can reduce a time of battery level adjustment of the power battery of each carriage, so that a battery level of the power battery of each carriage can be in a balanced state as soon as possible. It is to be noted that, the battery level of the power battery of each carriage being in the balanced state means that the battery level of the power battery of each carriage is the same or similar.

Embodiment 4

Figure 4:
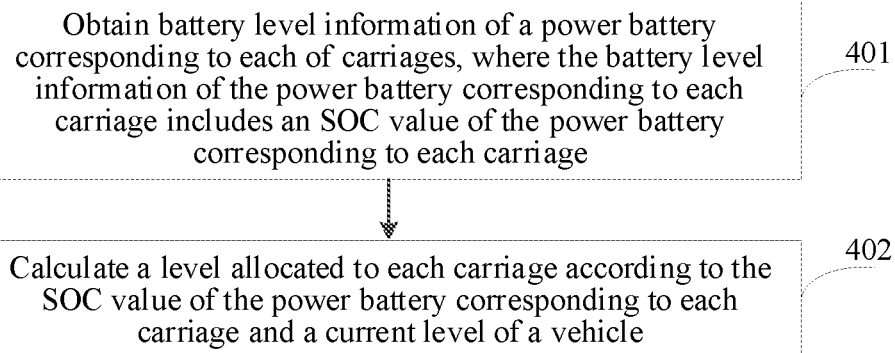
FIG. 4 is a schematic flowchart of a driving control method for a vehicle according to Embodiment 4 of the present disclosure.

FIG. 4 is a schematic flowchart of a driving control method for a vehicle according to Embodiment 4 of the present disclosure. As shown in FIG. 4, the driving control method for a vehicle includes the following steps:

Step 401. Obtain battery level information of a power battery corresponding to each of carriages, where the battery level information of the power battery corresponding to each carriage includes an SOC value of the power battery corresponding to each carriage.

In this embodiment of the present disclosure, the vehicle includes at least two carriages, and each carriage is provided with a power battery, and a motor controller and a drive motor connected to the power battery. The battery level information of the power battery of each carriage may be acquired through a battery management system corresponding to the power battery, and be sent to the driving control apparatus for a vehicle.

It is to be noted that, SOC is a state of charge, which is a physical quantity used for reflecting remaining capacity of a power battery.

Step 402. Calculate a level allocated to each carriage according to the SOC value of the power battery corresponding to each carriage and a current level of the vehicle.

In this embodiment of the present disclosure, the level allocated to each carriage may be calculated according to a first formula, and the first formula is: $X_a = K \cdot X \cdot A \cdot S_a / (S_1 + S_2 + \ldots + S_n)$, where $X_a$ is a level allocated to an $a^{th}$ carriage, K is an allocation coefficient, X is the current level of the vehicle, A is a quantity of carriages, $S_a$ is an SOC value of a power battery of the $a^{th}$ carriage, $S_1$ is an SOC value of a power battery of a first carriage, $S_2$ is an SOC value of a power battery of a second carriage, and $S_n$ is an SOC value of a power battery of a $n^{th}$ carriage. The allocation coefficient K is not a fixed value, and K≥1, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain the current level of the vehicle through a driver console of the vehicle, where the level represents a level of traction applied to the vehicle. The driving control apparatus for a vehicle calculates the level allocated to each carriage according to the current level of the vehicle and the SOC value of the power battery corresponding to each carriage. It can be seen from the driving control method for a vehicle that, the larger a level allocated to a carriage with a larger SOC value of a power battery is, the faster battery level consumption of the power battery corresponding to the carriage is. In this way, the battery level of the power battery of each carriage is in the balanced state.

It is to be noted that, a maximum value of $X_a$ cannot exceed a level threshold, and the level threshold is generally set to 100. In response to that a calculated value of a level allocated to a carriage is greater than the level threshold, a value of the level allocated to the carriage is set to the level threshold. In other words, in response to that a calculated value of a level allocated to a carriage is greater than 100, a value of the level allocated to the carriage is set to 100.

Embodiment 5

Figure 5:
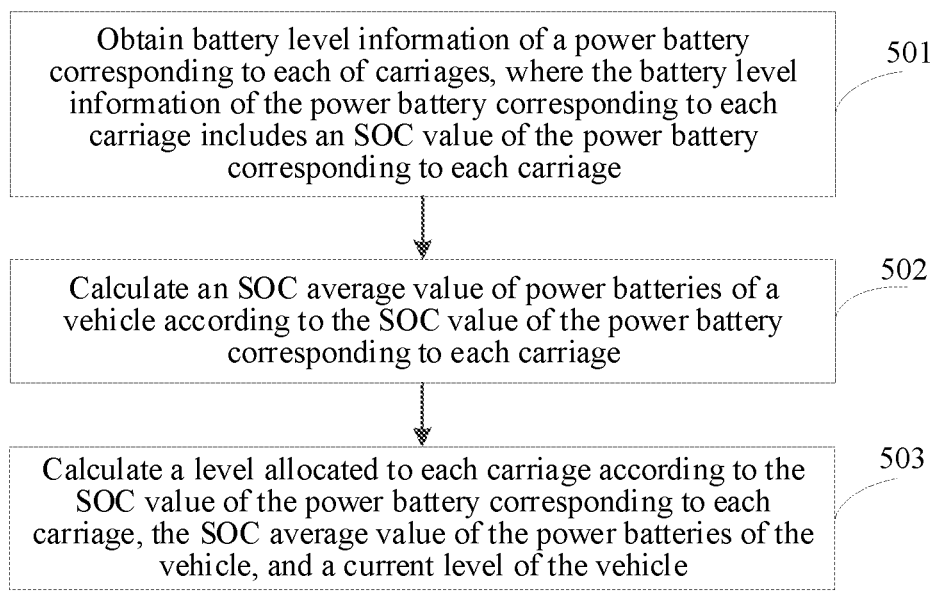
FIG. 5 is a schematic flowchart of a driving control method for a vehicle according to Embodiment 5 of the present disclosure.

FIG. 5 is a schematic flowchart of a driving control method for a vehicle according to Embodiment 5 of the present disclosure. As shown in FIG. 5, the driving control method for a vehicle includes the following steps:

Step 501. Obtain battery level information of a power battery corresponding to each of carriages, where the battery level information of the power battery corresponding to each carriage includes an SOC value of the power battery corresponding to each carriage.

In this embodiment of the present disclosure, the vehicle includes at least two carriages, and each carriage is provided with a power battery, and a motor controller and a drive motor connected to the power battery. The battery level information of the power battery of each carriage may be acquired through a battery management system corresponding to the power battery, and be sent to the driving control apparatus for a vehicle.

SOC is a state of charge, which is a physical quantity used for reflecting remaining capacity of a power battery.

Step 502. Calculate an SOC average value of the power batteries of the vehicle according to the SOC value of the power battery corresponding to each carriage.

As a possible implementation of Embodiment 5 of the present disclosure, when the vehicle includes two carriages, that is, the vehicle includes a first carriage and a second carriage, and each carriage is provided with a power battery, and a motor controller and a drive motor connected to the power battery, during a running process of the vehicle, the driving control apparatus for a vehicle messages with battery management systems of the first carriage and the second carriage respectively in real time, to obtain battery level information of a power battery of the first carriage and battery level information of a power battery of the second carriage; estimates an SOC value of the power battery of the first carriage as $S_1$ according to the battery level information of the power battery of the first carriage; estimates an SOC value of the power battery of the second carriage as $S_2$ according to the battery level information of the power battery of the second carriage; and obtains the SOC average value of the power batteries of the vehicle by averaging, namely, $S_j=(S_1+S_2)/2$.

Step 503. Calculate a level allocated to each carriage according to the SOC value of the power battery corresponding to each carriage, the SOC average value of the power batteries of the vehicle, and a current level of the vehicle.

In this embodiment of the present disclosure, in response to that $S_a-S_j \geq S_y$, the level allocated to each carriage is calculated according to a second formula, and the second formula is: $X_a=K \cdot X \cdot S_a/S_j$; and in response to that $S_a-S_j<S_y$, the level allocated to each carriage is calculated according to a third formula, and the third formula is: $X_a=X \cdot S_a/S_j$, where, $X_a$ is a level allocated to an $a^{th}$ carriage, K is an allocation coefficient, X is the current level of the vehicle, $S_a$ is an SOC value of a power battery of the $a^{th}$ carriage, $S_j$ is the SOC average value of the power batteries of the vehicle, and $S_y$ is a battery level threshold. The allocation coefficient K is not a fixed value, and K≥1, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain the current level of the vehicle through a driver console of the vehicle, where the level represents a level of traction applied to the vehicle. The driving control apparatus for a vehicle calculates the level allocated to each carriage according to the current level of the vehicle, the SOC value of the power battery corresponding to each carriage, and the SOC average value of the power batteries of the vehicle. It can be seen from the driving control method for a vehicle that, the larger a level allocated to a carriage with a larger SOC value of a power battery is, the faster battery level consumption of the power battery corresponding to the carriage is. In this way, the battery level of the power battery of each carriage is in the balanced state.

It is to be noted that, a maximum value of $X_a$ cannot exceed a level threshold, and the level threshold is generally set to 100. In response to that a calculated value of a level allocated to a carriage is greater than the level threshold, a value of the level allocated to the carriage is set to the level threshold. In other words, in response to that a calculated value of a level allocated to a carriage is greater than 100, a value of the level allocated to the carriage is set to 100.

Embodiment 6

Figure 6:
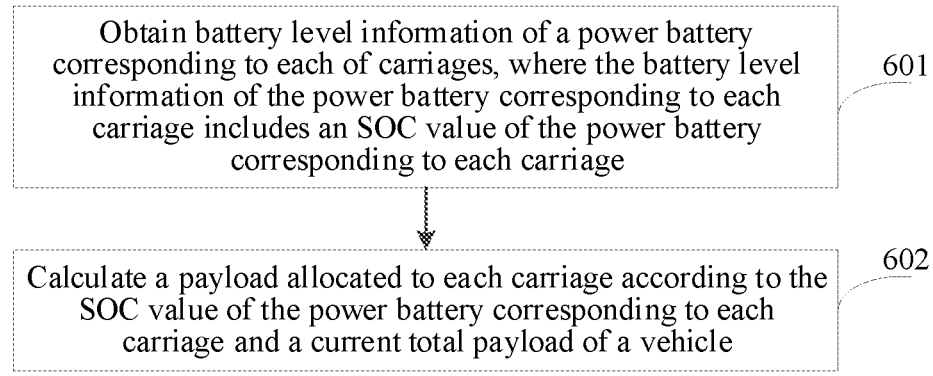
FIG. 6 is a schematic flowchart of a driving control method for a vehicle according to Embodiment 6 of the present disclosure.

FIG. 6 is a schematic flowchart of a driving control method for a vehicle according to Embodiment 6 of the present disclosure. As shown in FIG. 6, the driving control method for a vehicle includes the following steps:

Step 601. Obtain battery level information of a power battery corresponding to each of carriages, where the battery level information of the power battery corresponding to each carriage includes an SOC value of the power battery corresponding to each carriage.

In this embodiment of the present disclosure, the vehicle includes at least two carriages, and each carriage is provided with a power battery, and a motor controller and a drive motor connected to the power battery. The battery level information of the power battery of each carriage may be acquired through a battery management system corresponding to the power battery, and be sent to the driving control apparatus for a vehicle.

SOC is a state of charge, which is a physical quantity used for reflecting remaining capacity of a power battery.

Step 602. Calculate a payload allocated to each carriage according to the SOC value of the power battery corresponding to each carriage and a current total payload of the vehicle.

In this embodiment of the present disclosure, the payload allocated to each carriage may be calculated according to a fourth formula, and the fourth formula is: $M_a = K \cdot M \cdot S_a/(S_1 + S_2 + \ldots + S_n)$, where, $M_a$ is a payload allocated to an $a^{th}$ carriage, M is the current total payload of the vehicle, $S_a$ is an SOC value of a power battery of the $a^{th}$ carriage, $S_1$ is an SOC value of a power battery of a first carriage, $S_2$ is an SOC value of a power battery of a second carriage, and $S_n$ is an SOC value of a power battery of a $n^{th}$ carriage. The allocation coefficient K is not a fixed value, and K≥1, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain a current total payload of the vehicle through a payload sensor or a barometric sensor. The driving control apparatus for a vehicle calculates the payload allocated to each carriage according to the current total payload of the vehicle and the SOC value of the power battery corresponding to each carriage. It can be seen from the driving control method for a vehicle that, the larger a payload allocated to a carriage with a larger SOC value of a power battery is, the faster battery level consumption of the power battery corresponding to the carriage is. In this way, the battery level of the power battery of each carriage is in the balanced state.

It is to be noted that, in response to that a calculated value of a payload allocated to a carriage is less than a first payload value, a value of the payload allocated to the carriage is set to the first payload value; and in response to that a calculated value of a payload allocated to a carriage is greater than a second payload value, a value of the payload allocated to the carriage is set to the second payload value, and the first payload value is greater than the second payload value. The first payload value and the second payload value may be determined according to an actual running condition of the vehicle.

Embodiment 7

Figure 7:
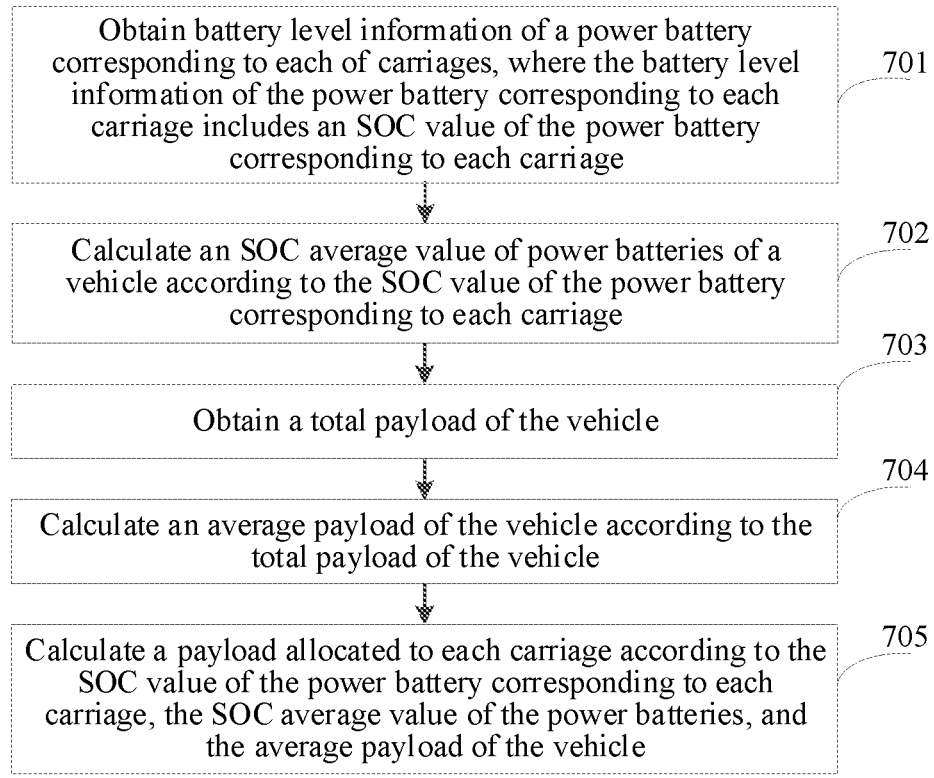
FIG. 7 is a schematic flowchart of a driving control method for a vehicle according to Embodiment 7 of the present disclosure.

FIG. 7 is a schematic flowchart of a driving control method for a vehicle according to Embodiment 7 of the present disclosure. As shown in FIG. 7, the driving control method for a vehicle includes the following steps:

Step 701. Obtain battery level information of a power battery corresponding to each of carriages, where the battery level information of the power battery corresponding to each carriage includes an SOC value of the power battery corresponding to each carriage.

In this embodiment of the present disclosure, the vehicle includes at least two carriages, and each carriage is provided with a power battery, and a motor controller and a drive motor connected to the power battery. The battery level information of the power battery of each carriage may be acquired through a battery management system corresponding to the power battery, and be sent to the driving control apparatus for a vehicle.

SOC is a state of charge, which is a physical quantity used for reflecting remaining capacity of a power battery.

Step 702. Calculate an SOC average value of the power batteries of the vehicle according to the SOC value of the power battery corresponding to each carriage.

As a possible implementation of Embodiment 7 of the present disclosure, when the vehicle includes two carriages, that is, the vehicle includes a first carriage and a second carriage, and each carriage is provided with a power battery, and a motor controller and a drive motor connected to the power battery, during a running process of the vehicle, the driving control apparatus for a vehicle messages with battery management systems of the first carriage and the second carriage respectively in real time, to obtain battery level information of a power battery of the first carriage and battery level information of a power battery of the second carriage; estimates an SOC value of the power battery of the first carriage as $S_1$ according to the battery level information of the power battery of the first carriage; estimates an SOC value of the power battery of the second carriage as $S_2$ according to the battery level information of the power battery of the second carriage; and obtains the SOC average value of the power batteries of the vehicle by averaging, namely, $S_j = (S_1 + S_2)/2$.

Step 703. Obtain a total payload of the vehicle.

In this embodiment of the present disclosure, the driving control apparatus for a vehicle may obtain a current total payload of the vehicle through a payload sensor or a barometric sensor.

Step 704. Calculate an average payload of the vehicle according to the total payload of the vehicle.

As a possible implementation of Embodiment 7 of the present disclosure, when the vehicle includes two carriages, that is, the vehicle includes a first carriage and a second carriage, the driving control apparatus for a vehicle may obtain a payload $M_1$ of the first carriage and a payload $M_2$ of the second carriage through the payload sensor or the barometric sensor, and obtain the average payload of the vehicle by averaging, namely, $M_j = (M_1 + M_2)/2$.

Step 705. Calculate a payload allocated to each carriage according to the SOC value of the power battery corresponding to each carriage, the SOC average value of the power batteries, and the average payload of the vehicle.

In this embodiment of the present disclosure, in response to that $S_a - S_j \geq S_y$, the payload allocated to each carriage is calculated according to a fifth formula, and the fifth formula is: $M_a = K \cdot M_j \cdot S_a/S_j$; and in response to that $S_a - S_j < S_y$, the payload allocated to each carriage is calculated according to a sixth formula, and the sixth formula is: $M_a = M_j \cdot S_a/S_j$, where, $M_a$ is a payload allocated to an $a^{th}$ carriage, K is an allocation coefficient, $M_j$ is the average payload of the vehicle, $S_a$ is an SOC value of a power battery of the $a^{th}$ carriage, $S_j$ is the SOC average value of the power batteries of the vehicle, and $S_y$ is a battery level threshold. The allocation coefficient K is not a fixed value, and K≥1, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain the current total payload of the vehicle through the payload sensor or the barometric sensor, and calculate the average payload of the vehicle according to the current total payload of the vehicle. The driving control apparatus for a vehicle calculates the payload allocated to each carriage according to the average payload of the vehicle, the SOC value of the power battery corresponding to each carriage, and the SOC average value of the power batteries. It can be seen from the driving control method for a vehicle that, the larger a payload allocated to a carriage with a larger SOC value of a power battery is, the faster battery level consumption of the power battery corresponding to the carriage is. In this way, the battery level of the power battery of each carriage is in the balanced state.

It is to be noted that, in response to that a calculated value of a payload allocated to a carriage is less than a first payload value, a value of the payload allocated to the carriage is set to the first payload value; and in response to that a calculated value of a payload allocated to a carriage is greater than a second payload value, a value of the payload allocated to the carriage is set to the second payload value, and the first payload value is greater than the second payload value. The first payload value and the second payload value may be determined according to an actual running condition of the vehicle.

Embodiment 8

Figure 8:
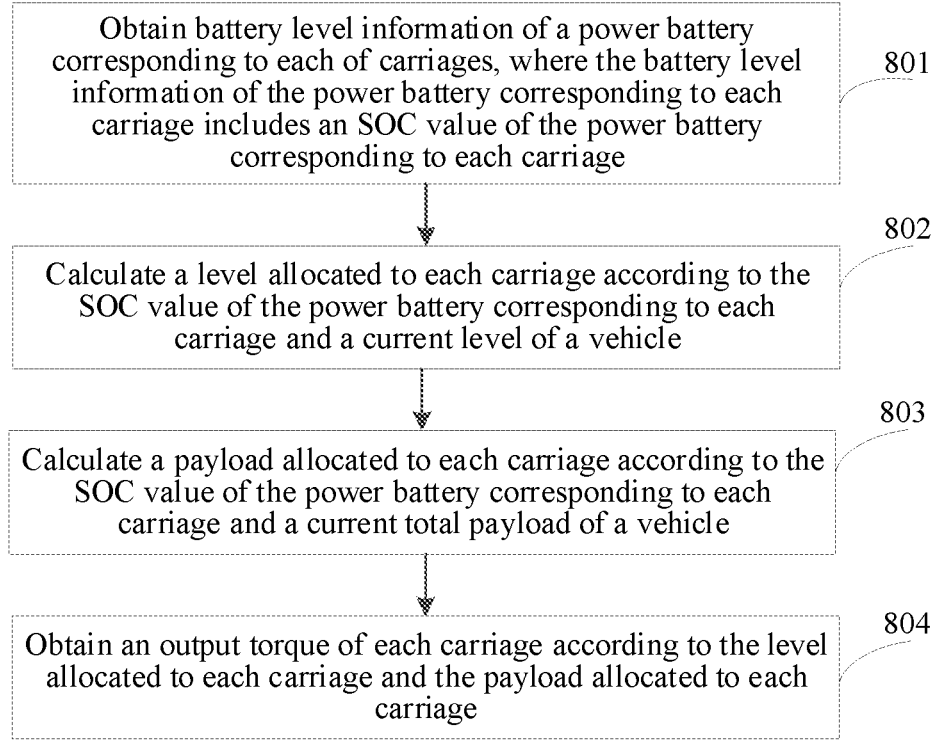
FIG. 8 is a schematic flowchart of a driving control method for a vehicle according to Embodiment 8 of the present disclosure.

FIG. 8 is a schematic flowchart of a driving control method for a vehicle according to Embodiment 8 of the present disclosure. As shown in FIG. 8, the driving control method for a vehicle includes the following steps:

Step 801. Obtain battery level information of a power battery corresponding to each of carriages, where the battery level information of the power battery corresponding to each carriage includes an SOC value of the power battery corresponding to each carriage.

In this embodiment of the present disclosure, the vehicle includes at least two carriages, and each carriage is provided with a power battery, and a motor controller and a drive motor connected to the power battery. The battery level information of the power battery of each carriage may be acquired through a battery management system corresponding to the power battery, and be sent to the driving control apparatus for a vehicle.

SOC is a state of charge, which is a physical quantity used for reflecting remaining capacity of a power battery.

Step 802. Calculate a level allocated to each carriage according to the SOC value of the power battery corresponding to each carriage and a current level of the vehicle.

In this embodiment of the present disclosure, the level allocated to each carriage may be calculated according to a first formula, and the first formula is: $X_a = K \cdot X \cdot A \cdot S_a / (S_1 + S_2 + \ldots + S_a)$, where, $X_a$ is a level allocated to an $a^{th}$ carriage, K is an allocation coefficient, X is the current level of the vehicle, A is a quantity of carriages, $S_a$ is an SOC value of a power battery of the $a^{th}$ carriage, $S_1$ is an SOC value of a power battery of a first carriage, $S_2$ is an SOC value of a power battery of a second carriage, and $S_n$ is an SOC value of a power battery of a $n^{th}$ carriage. The allocation coefficient K is not a fixed value, and $K \geq 1$, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain the current level of the vehicle through a driver console of the vehicle, where the level represents a level of traction applied to the vehicle. The driving control apparatus for a vehicle calculates the level allocated to each carriage according to the current level of the vehicle and the SOC value of the power battery corresponding to each carriage. It can be seen from the driving control method for a vehicle that, the larger a level allocated to a carriage with a larger SOC value of a power battery is, the faster battery level consumption of the power battery corresponding to the carriage is. In this way, the battery level of the power battery of each carriage is in the balanced state.

It is to be noted that, a maximum value of $X_a$ cannot exceed a level threshold, and the level threshold is generally set to 100. In response to that a calculated value of a level allocated to a carriage is greater than the level threshold, a value of the level allocated to the carriage is set to the level threshold. In other words, in response to that a calculated value of a level allocated to a carriage is greater than 100, a value of the level allocated to the carriage is set to 100.

Step 803. Calculate a payload allocated to each carriage according to the SOC value of the power battery corresponding to each carriage and a current total payload of the vehicle.

In this embodiment of the present disclosure, the payload allocated to each carriage may be calculated according to a fourth formula, and the fourth formula is: $M_a = K \cdot M \cdot S_a / (S_1 + S_2 + \ldots + S_n)$, where, $M_a$ is a payload allocated to an $a^{th}$ carriage, M is the current total payload of the vehicle, $S_a$ is an SOC value of a power battery of the $a^{th}$ carriage, $S_1$ is an SOC value of a power battery of a first carriage, $S_a$ is an SOC value of a power battery of a second carriage, and $S_n$ is an SOC value of a power battery of a $n^{th}$ carriage. The allocation coefficient K is not a fixed value, and $K \geq 1$, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain a current total payload of the vehicle through a payload sensor or a barometric sensor. The driving control apparatus for a vehicle calculates the payload allocated to each carriage according to the current total payload of the vehicle and the SOC value of the power battery corresponding to each carriage. It can be seen from the driving control method for a vehicle that, the larger a payload allocated to a carriage with a larger SOC value of a power battery is, the faster battery level consumption of the power battery corresponding to the carriage is. In this way, the battery level of the power battery of each carriage is in the balanced state.

It is to be noted that, in response to that a calculated value of a payload allocated to a carriage is less than a first payload value, a value of the payload allocated to the carriage is set to the first payload value; and in response to that a calculated value of a payload allocated to a carriage is greater than a second payload value, a value of the payload allocated to the carriage is set to the second payload value, and the first payload value is greater than the second payload value. The first payload value and the second payload value may be determined according to an actual running condition of the vehicle.

Step 804. Obtain an output torque of each carriage according to the level allocated to each carriage and the payload allocated to each carriage.

In this embodiment of the present disclosure, the output torque of each carriage may be calculated according to a seventh formula, and the seventh formula is: $T_a=((M_a+m) \cdot 1000 \cdot K_d \cdot X_a + M_a \cdot g \cdot w) \cdot R/(\eta \cdot i)$, where, $T_a$ is an output torque of an $a^{th}$ carriage, $M_a$ is a payload allocated to the $a^{th}$ carriage, m is a rotating mass, $K_d$ is an equivalent acceleration, $X_a$ is a level allocated to the $a^{th}$ carriage, g is an acceleration of gravity, w is unit basic resistance, R is a tire radius of the vehicle, $\eta$ is efficiency of a reducer, and i is a speed reduction ratio.

In this embodiment of the present disclosure, battery level information of a power battery corresponding to each of carriages is obtained, so that different levels are allocated to different carriages, and then each carriage outputs a different torque. That is, after battery level information of power batteries of all carriages of a vehicle is mastered, a carriage with a high battery level or a low battery level is identified, and then a level is allocated to each carriage accordingly, to control each carriage to output a different torque. In other words, by adjusting battery level consumption of the power battery corresponding to each carriage, a battery level of the power battery corresponding to each carriage being the same or similar is finally achieved. In this way, after the vehicle runs for a long time, a problem that a battery level of the vehicle is insufficient to meet driving requirements of the vehicle because battery levels of power batteries in different carriages are inconsistent, and a power battery with a lower battery level cannot provide an enough battery level to an apparatus in a corresponding carriage is effectively avoided.

Embodiment 9

Figure 9:
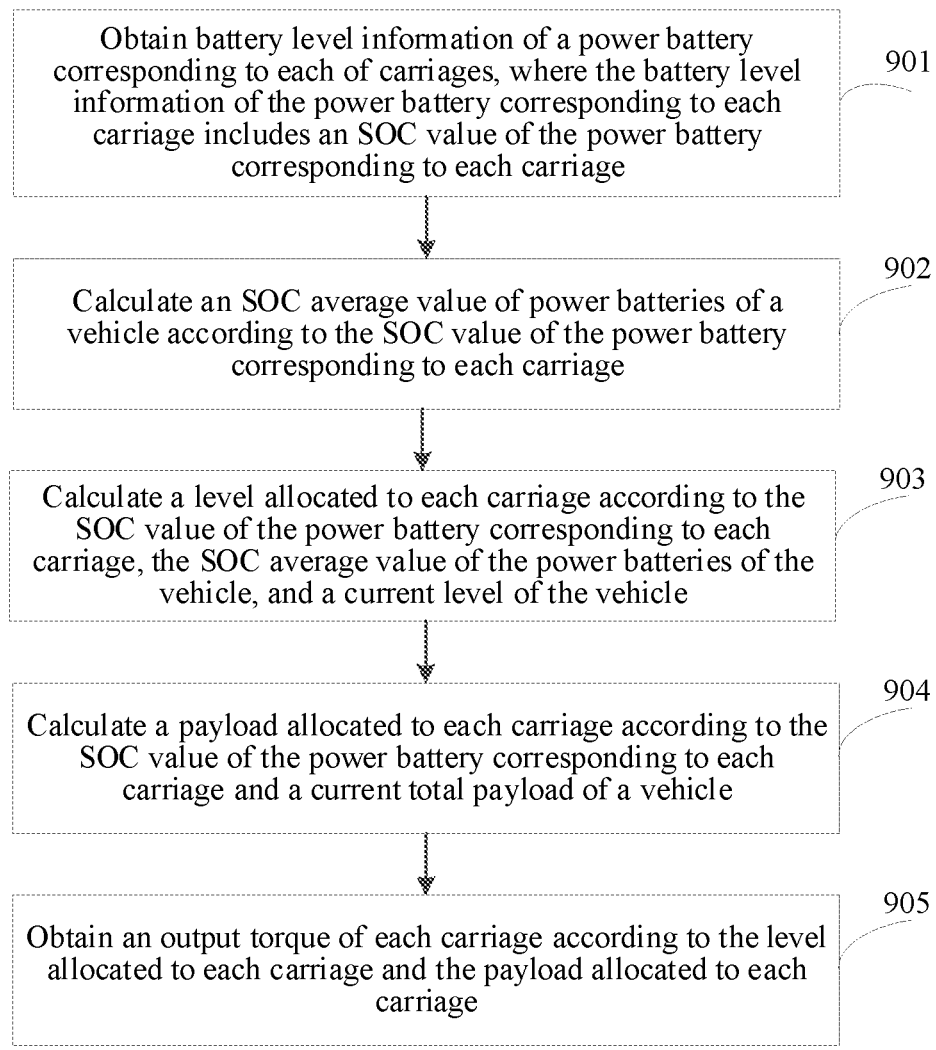
FIG. 9 is a schematic flowchart of a driving control method for a vehicle according to Embodiment 9 of the present disclosure.

FIG. 9 is a schematic flowchart of a driving control method for a vehicle according to Embodiment 9 of the present disclosure. As shown in FIG. 9, the driving control method for a vehicle includes the following steps:

Step 901. Obtain battery level information of a power battery corresponding to each of carriages, where the battery level information of the power battery corresponding to each carriage includes an SOC value of the power battery corresponding to each carriage.

In this embodiment of the present disclosure, the vehicle includes at least two carriages, and each carriage is provided with a power battery, and a motor controller and a drive motor connected to the power battery. The battery level information of the power battery of each carriage may be acquired through a battery management system corresponding to the power battery, and be sent to the driving control apparatus for a vehicle.

SOC is a state of charge, which is a physical quantity used for reflecting remaining capacity of a power battery.

Step 902. Calculate an SOC average value of the power batteries of the vehicle according to the SOC value of the power battery corresponding to each carriage.

As a possible implementation of Embodiment 9 of the present disclosure, when the vehicle includes two carriages, that is, the vehicle includes a first carriage and a second carriage, and each carriage is provided with a power battery, and a motor controller and a drive motor connected to the power battery, during a running process of the vehicle, the driving control apparatus for a vehicle messages with battery management systems of the first carriage and the second carriage respectively in real time, to obtain battery level information of a power battery of the first carriage and battery level information of a power battery of the second carriage; estimates an SOC value of the power battery of the first carriage as $S_1$ according to the battery level information of the power battery of the first carriage; estimates an SOC value of the power battery of the second carriage as $S_2$ according to the battery level information of the power battery of the second carriage; and obtains the SOC average value of the power batteries of the vehicle by averaging, namely, $S_j=(S_1+S_2)/2$.

Step 903. Calculate a level allocated to each carriage according to the SOC value of the power battery corresponding to each carriage, the SOC average value of the power batteries of the vehicle, and a current level of the vehicle.

In this embodiment of the present disclosure, in response to that $S_a-S_j \geq S_y$, the level allocated to each carriage is calculated according to a second formula, and the second formula is: $X_a=K \cdot X \cdot S_a/S_j$; and in response to that $S_a-S_j<S_y$, the level allocated to each carriage is calculated according to a third formula, and the third formula is: $X_a=X \cdot S_a/S_j$, where, $X_a$ is a level allocated to an $a^{th}$ carriage, K is an allocation coefficient, X is the current level of the vehicle, $S_a$ is an SOC value of a power battery of the $a^{th}$ carriage, $S_j$ is the SOC average value of the power batteries of the vehicle, and $S_y$ is a battery level threshold. The allocation coefficient K is not a fixed value, and $K \geq 1$, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain the current level of the vehicle through a driver console of the vehicle, where the level represents a level of traction applied to the vehicle. The driving control apparatus for a vehicle calculates the level allocated to each carriage according to the current level of the vehicle, the SOC value of the power battery corresponding to each carriage, and the SOC average value of the power batteries of the vehicle. It can be seen from the driving control method for a vehicle that, the larger a level allocated to a carriage with a larger SOC value of a power battery is, the faster battery level consumption of the power battery corresponding to the carriage is. In this way, the battery level of the power battery of each carriage is in the balanced state.

It is to be noted that, a maximum value of $X_a$ cannot exceed a level threshold, and the level threshold is generally set to 100. In response to that a calculated value of a level allocated to a carriage is greater than the level threshold, a value of the level allocated to the carriage is set to the level threshold. In other words, in response to that a calculated value of a level allocated to a carriage is greater than 100, a value of the level allocated to the carriage is set to 100.

Step 904. Calculate a payload allocated to each carriage according to the SOC value of the power battery corresponding to each carriage and a current total payload of the vehicle.

In this embodiment of the present disclosure, the payload allocated to each carriage may be calculated according to a fourth formula, and the fourth formula is: $M_a=K \cdot M \cdot S_a/(S_1+S_2+\ldots+S_n)$, where, $M_a$ is a payload allocated to an $a^{th}$ carriage, M is the current total payload of the vehicle, $S_a$ is an SOC value of a power battery of the $a^{th}$ carriage, $S_1$ is an SOC value of a power battery of a first carriage, $S_2$ is an SOC value of a power battery of a second carriage, and $S_n$ is an SOC value of a power battery of a $n^{th}$ carriage. The allocation coefficient K is not a fixed value, and $K \geq 1$, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain a current total payload of the vehicle through a payload sensor or a barometric sensor. The driving control apparatus for a vehicle calculates the payload allocated to each carriage according to the current total payload of the vehicle and the SOC value of the power battery corresponding to each carriage. It can be seen from the driving control method for a vehicle that, the larger a payload allocated to a carriage with a larger SOC value of a power battery is, the faster battery level consumption of the power battery corresponding to the carriage is. In this way, the battery level of the power battery of each carriage is in the balanced state.

It is to be noted that, in response to that a calculated value of a payload allocated to a carriage is less than a first payload value, a value of the payload allocated to the carriage is set to the first payload value; and in response to that a calculated value of a payload allocated to a carriage is greater than a second payload value, a value of the payload allocated to the carriage is set to the second payload value, and the first payload value is greater than the second payload value. The first payload value and the second payload value may be determined according to an actual running condition of the vehicle.

Step 905. Obtain an output torque of each carriage according to the level allocated to each carriage and the payload allocated to each carriage.

In this embodiment of the present disclosure, the output torque of each carriage may be calculated according to a seventh formula, and the seventh formula is: $T_a=((M_a+m) \cdot 1000 \cdot K_d \cdot X_a + M_a \cdot g \cdot w) \cdot R/(\eta \cdot i)$, where, $T_a$ is an output torque of an $a^{th}$ carriage, $M_a$ is a payload allocated to the $a^{th}$ carriage, m is a rotating mass, $K_d$ is an equivalent acceleration, $X_a$ is a level allocated to the $a^{th}$ carriage, g is an acceleration of gravity, w is unit basic resistance, R is a tire radius of the vehicle, $\eta$ is efficiency of a reducer, and i is a speed reduction ratio.

In this embodiment of the present disclosure, battery level information of a power battery corresponding to each of carriages is obtained, so that different levels are allocated to different carriages, and then each carriage outputs a different torque. That is, after battery level information of power batteries of all carriages of a vehicle is mastered, a carriage with a high battery level or a low battery level is identified, and then a level is allocated to each carriage accordingly, to control each carriage to output a different torque. In other words, by adjusting battery level consumption of the power battery corresponding to each carriage, a battery level of the power battery corresponding to each carriage being the same or similar is finally achieved. In this way, after the vehicle runs for a long time, a problem that a battery level of the vehicle is insufficient to meet driving requirements of the vehicle because battery levels of power batteries in different carriages are inconsistent, and a power battery with a lower battery level cannot provide an enough battery level to an apparatus in a corresponding carriage is effectively avoided.

Embodiment 10

Figure 10:
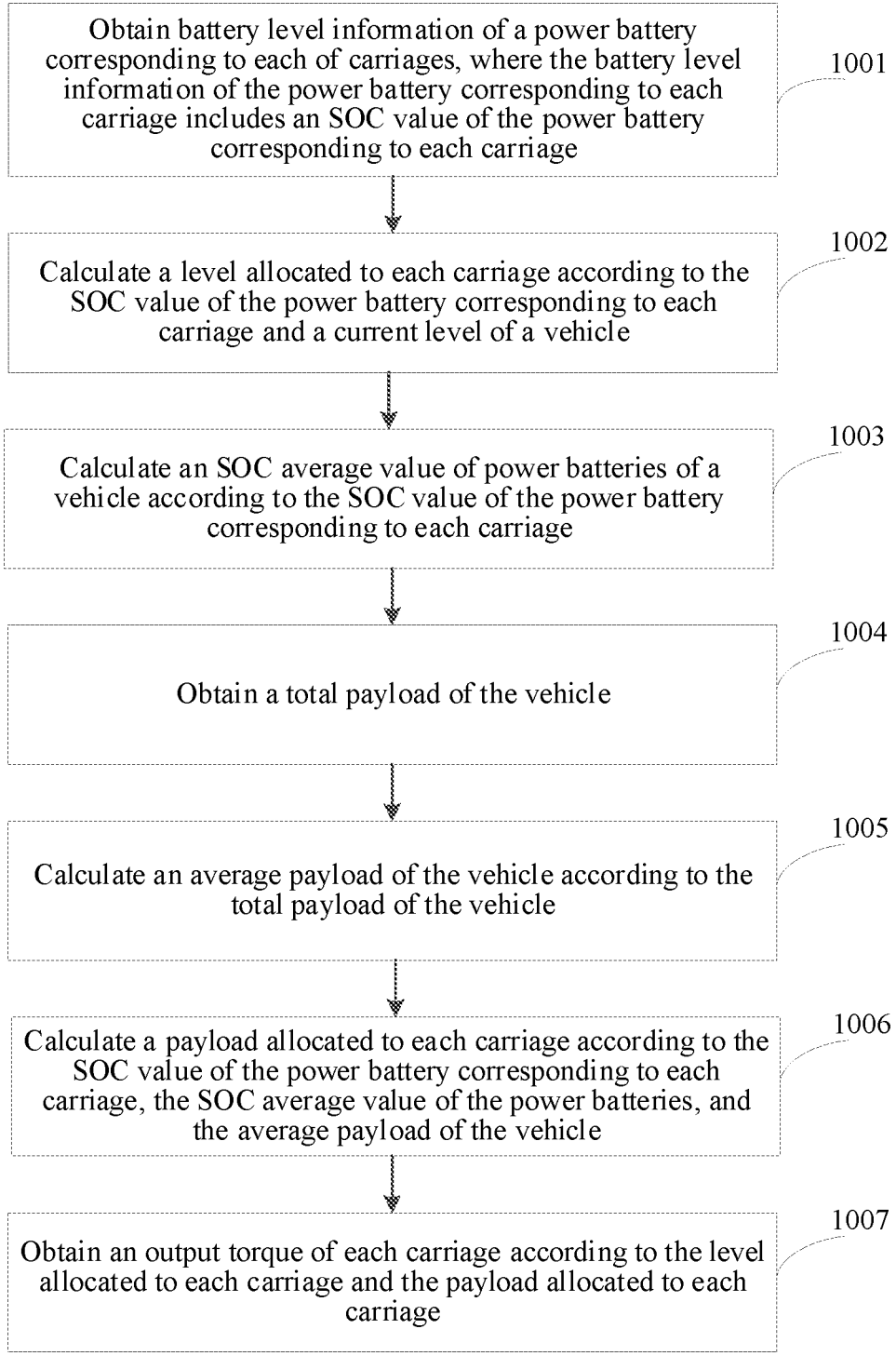
FIG. 10 is a schematic flowchart of a driving control method for a vehicle according to Embodiment 10 of the present disclosure.

FIG. 10 is a schematic flowchart of a driving control method for a vehicle according to Embodiment 10 of the present disclosure. As shown in FIG. 10, the driving control method for a vehicle includes the following steps:

Step 1001. Obtain battery level information of a power battery corresponding to each of carriages, where the battery level information of the power battery corresponding to each carriage includes an SOC value of the power battery corresponding to each carriage.

In this embodiment of the present disclosure, the vehicle includes at least two carriages, and each carriage is provided with a power battery, and a motor controller and a drive motor connected to the power battery. The battery level information of the power battery of each carriage may be acquired through a battery management system corresponding to the power battery, and be sent to the driving control apparatus for a vehicle.

SOC is a state of charge, which is a physical quantity used for reflecting remaining capacity of a power battery.

Step 1002. Calculate a level allocated to each carriage according to the SOC value of the power battery corresponding to each carriage and a current level of the vehicle.

In this embodiment of the present disclosure, the level allocated to each carriage may be calculated according to a first formula, and the first formula is: $X_a = K \cdot X \cdot A \cdot S_a/(S_1+S_2+ \ldots +S_a)$, where, $X_a$ is a level allocated to an $a^{th}$ carriage, K is an allocation coefficient, X is the current level of the vehicle, A is a quantity of carriages, $S_a$ is an SOC value of a power battery of the $a^{th}$ carriage, $S_1$ is an SOC value of a power battery of a first carriage, $S_2$ is an SOC value of a power battery of a second carriage, and $S_n$ is an SOC value of a power battery of a $n^{th}$ carriage. The allocation coefficient K is not a fixed value, and $K \geq 1$, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain the current level of the vehicle through a driver console of the vehicle, where the level represents a level of traction applied to the vehicle. The driving control apparatus for a vehicle calculates the level allocated to each carriage according to the current level of the vehicle and the SOC value of the power battery corresponding to each carriage. It can be seen from the driving control method for a vehicle that, the larger a level allocated to a carriage with a larger SOC value of a power battery is, the faster battery level consumption of the power battery corresponding to the carriage is. In this way, the battery level of the power battery of each carriage is in the balanced state.

It is to be noted that, a maximum value of $X_a$ cannot exceed a level threshold, and the level threshold is generally set to 100. In response to that a calculated value of a level allocated to a carriage is greater than the level threshold, a value of the level allocated to the carriage is set to the level threshold. In other words, in response to that a calculated value of a level allocated to a carriage is greater than 100, a value of the level allocated to the carriage is set to 100.

Step 1003. Calculate an SOC average value of the power batteries of the vehicle according to the SOC value of the power battery corresponding to each carriage.

As a possible implementation of Embodiment 10 of the present disclosure, when the vehicle includes two carriages, that is, the vehicle includes a first carriage and a second carriage, and each carriage is provided with a power battery, and a motor controller and a drive motor connected to the power battery, during a running process of the vehicle, the driving control apparatus for a vehicle messages with battery management systems of the first carriage and the second carriage respectively in real time, to obtain battery level information of a power battery of the first carriage and battery level information of a power battery of the second carriage; estimates an SOC value of the power battery of the first carriage as $S^1$ according to the battery level information of the power battery of the first carriage; estimates an SOC value of the power battery of the second carriage as $S^2$ according to the battery level information of the power battery of the second carriage; and obtains the SOC average value of the power batteries of the vehicle by averaging, namely, $S_j=(S_1+S_2)/2$.

Step 1004. Obtain a total payload of the vehicle.

In this embodiment of the present disclosure, the driving control apparatus for a vehicle may obtain a current total payload of the vehicle through a payload sensor or a barometric sensor.

Step 1005. Calculate an average payload of the vehicle according to the total payload of the vehicle.

As a possible implementation of Embodiment 10 of the present disclosure, when the vehicle includes two carriages, that is, the vehicle includes a first carriage and a second carriage, the driving control apparatus for a vehicle may obtain a payload $M^1$ of the first carriage and a payload $M^2$ of the second carriage through the payload sensor or the barometric sensor, and obtain the average payload of the vehicle by averaging, namely, $M_j=(M_1+M_2)/2$.

Step 1006. Calculate a payload allocated to each carriage according to the SOC value of the power battery corresponding to each carriage, the SOC average value of the power batteries, and the average payload of the vehicle.

In this embodiment of the present disclosure, in response to that $S_a-S_j \geq S_y$, the payload allocated to each carriage is calculated according to a fifth formula, and the fifth formula is: $M_a=K \cdot M_j \cdot S_a/S_j$; and in response to that $S_a-S_j<S_y$, the payload allocated to each carriage is calculated according to a sixth formula, and the sixth formula is: $M_a=M_j \cdot S_a/S_j$, where, $M_a$ is a payload allocated to an $a^{th}$ carriage, K is an allocation coefficient, $M_j$ is the average payload of the vehicle, $S_a$ is an SOC value of a power battery of the $a^{th}$ carriage, $S_j$ is the SOC average value of the power batteries of the vehicle, and $S_y$ is a battery level threshold. The allocation coefficient K is not a fixed value, and $K \geq 1$, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain the current total payload of the vehicle through the payload sensor or the barometric sensor, and calculate the average payload of the vehicle according to the current total payload of the vehicle. The driving control apparatus for a vehicle calculates the payload allocated to each carriage according to the average payload of the vehicle, the SOC value of the power battery corresponding to each carriage, and the SOC average value of the power batteries. It can be seen from the driving control method for a vehicle that, the larger a payload allocated to a carriage with a larger SOC value of a power battery is, the faster battery level consumption of the power battery corresponding to the carriage is. In this way, the battery level of the power battery of each carriage is in the balanced state.

It is to be noted that, in response to that a calculated value of a payload allocated to a carriage is less than a first payload value, a value of the payload allocated to the carriage is set to the first payload value; and in response to that a calculated value of a payload allocated to a carriage is greater than a second payload value, a value of the payload allocated to the carriage is set to the second payload value, and the first payload value is greater than the second payload value. The first payload value and the second payload value may be determined according to an actual running condition of the vehicle.

Step 1007. Obtain an output torque of each carriage according to the level allocated to each carriage and the payload allocated to each carriage.

In this embodiment of the present disclosure, the output torque of each carriage may be calculated according to a seventh formula, and the seventh formula is: $T_a=((M_a+m) \cdot 1000 \cdot K_d \cdot X_a+M_a \cdot g \cdot w) \cdot R/(\eta \cdot i)$, where, $T_a$ is an output torque of an $a^{th}$ carriage, $M_a$ is a payload allocated to the $a^{th}$ carriage, m is a rotating mass, $K_d$ is an equivalent acceleration, $X_a$ is a level allocated to the $a^{th}$ carriage, g is an acceleration of gravity, w is unit basic resistance, R is a tire radius of the vehicle, $\eta$ is efficiency of a reducer, and i is a speed reduction ratio.

In this embodiment of the present disclosure, battery level information of a power battery corresponding to each of carriages is obtained, so that different levels are allocated to different carriages, and then each carriage outputs a different torque. That is, after battery level information of power batteries of all carriages of a vehicle is mastered, a carriage with a high battery level or a low battery level is identified, and then a level is allocated to each carriage accordingly, to control each carriage to output a different torque. In other words, by adjusting battery level consumption of the power battery corresponding to each carriage, a battery level of the power battery corresponding to each carriage being the same or similar is finally achieved. In this way, after the vehicle runs for a long time, a problem that a battery level of the vehicle is insufficient to meet driving requirements of the vehicle because battery levels of power batteries in different carriages are inconsistent, and a power battery with a lower battery level cannot provide an enough battery level to an apparatus in a corresponding carriage is effectively avoided.

Embodiment 11

Figure 11:
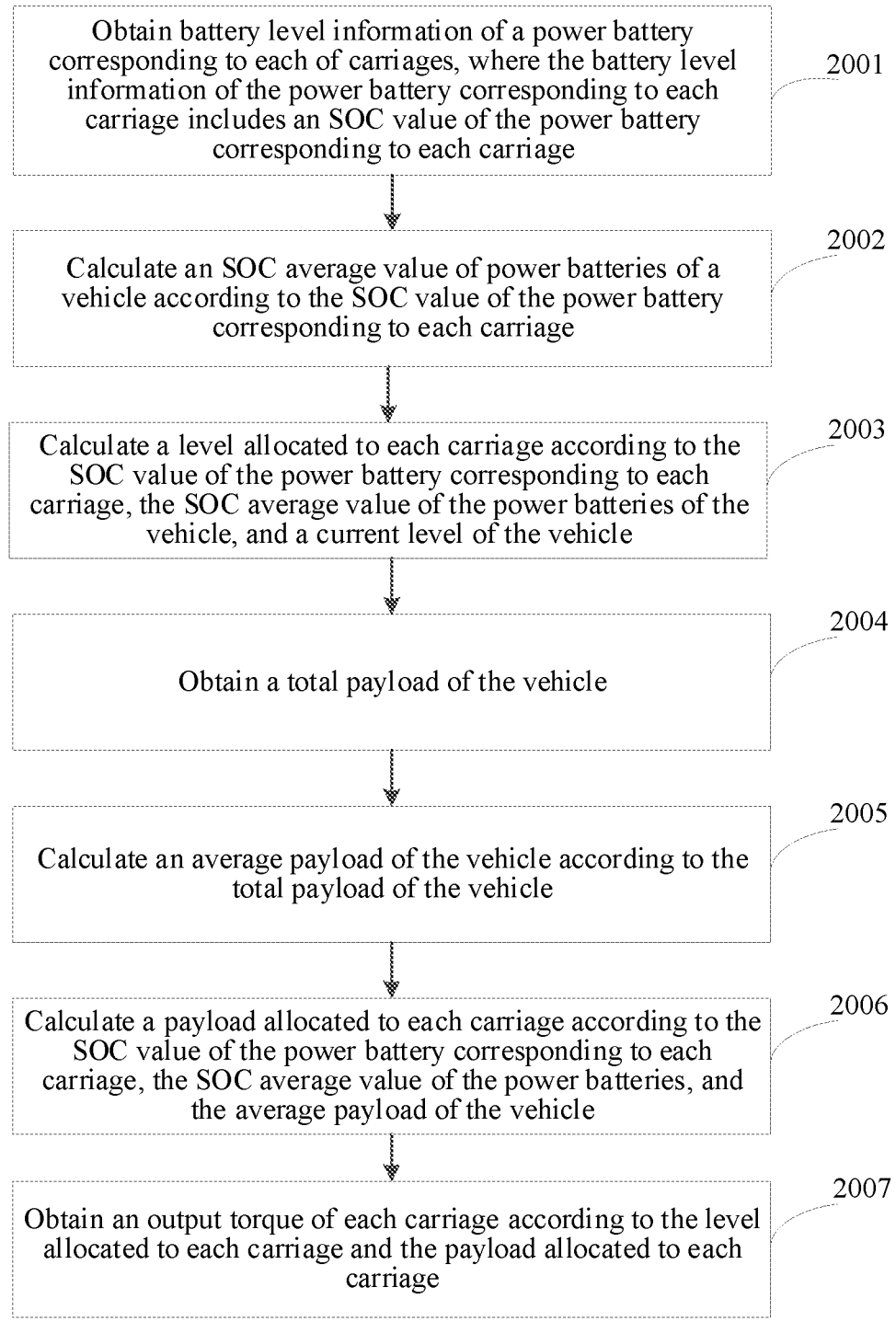
FIG. 11 is a schematic flowchart of a driving control method for a vehicle according to Embodiment 11 of the present disclosure.

FIG. 11 is a schematic flowchart of a driving control method for a vehicle according to Embodiment 10 of the present disclosure. As shown in FIG. 11, the driving control method for a vehicle includes the following steps:

Step 2001. Obtain battery level information of a power battery corresponding to each of carriages, where the battery level information of the power battery corresponding to each carriage includes an SOC value of the power battery corresponding to each carriage.

In this embodiment of the present disclosure, the vehicle includes at least two carriages, and each carriage is provided with a power battery, and a motor controller and a drive motor connected to the power battery. The battery level information of the power battery of each carriage may be acquired through a battery management system corresponding to the power battery, and be sent to the driving control apparatus for a vehicle.

SOC is a state of charge, which is a physical quantity used for reflecting remaining capacity of a power battery.

Step 2002. Calculate an SOC average value of the power batteries of the vehicle according to the SOC value of the power battery corresponding to each carriage.

As a possible implementation of Embodiment 11 of the present disclosure, when the vehicle includes two carriages, that is, the vehicle includes a first carriage and a second carriage, and each carriage is provided with a power battery, and a motor controller and a drive motor connected to the power battery, during a running process of the vehicle, the driving control apparatus for a vehicle messages with battery management systems of the first carriage and the second carriage respectively in real time, to obtain battery level information of a power battery of the first carriage and battery level information of a power battery of the second carriage; estimates an SOC value of the power battery of the first carriage as $S^1$ according to the battery level information of the power battery of the first carriage; estimates an SOC value of the power battery of the second carriage as $S^2$ according to the battery level information of the power battery of the second carriage; and obtains the SOC average value of the power batteries of the vehicle by averaging, namely, $S_j=(S_1+S_2)/2$.

Step 2003. Calculate a level allocated to each carriage according to the SOC value of the power battery corresponding to each carriage, the SOC average value of the power batteries of the vehicle, and a current level of the vehicle.

In this embodiment of the present disclosure, in response to that $S_a-S_j \geq S_y$, the level allocated to each carriage is calculated according to a second formula, and the second formula is: $X_a=K \cdot X \cdot S_a/S_j$; and in response to that $S_a-S_j<S_y$, the level allocated to each carriage is calculated according to a third formula, and the third formula is: $X_a=X \cdot S_a/S_j$, where, $X_a$ is a level allocated to an $a^{th}$ carriage, K is an allocation coefficient, X is the current level of the vehicle, $S_a$ is an SOC value of a power battery of the $a^{th}$ carriage, $S_j$ is the SOC average value of the power batteries of the vehicle, and $S_y$ is a battery level threshold. The allocation coefficient K is not a fixed value, and K≥1, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain the current level of the vehicle through a driver console of the vehicle, where the level represents a level of traction applied to the vehicle. The driving control apparatus for a vehicle calculates the level allocated to each carriage according to the current level of the vehicle, the SOC value of the power battery corresponding to each carriage, and the SOC average value of the power batteries of the vehicle. It can be seen from the driving control method for a vehicle that, the larger a level allocated to a carriage with a larger SOC value of a power battery is, the faster battery level consumption of the power battery corresponding to the carriage is. In this way, the battery level of the power battery of each carriage is in the balanced state.

It is to be noted that, a maximum value of $X_a$ cannot exceed a level threshold, and the level threshold is generally set to 100. In response to that a calculated value of a level allocated to a carriage is greater than the level threshold, a value of the level allocated to the carriage is set to the level threshold. In other words, in response to that a calculated value of a level allocated to a carriage is greater than 100, a value of the level allocated to the carriage is set to 100.

Step 2004. Obtain a total payload of the vehicle.

In this embodiment of the present disclosure, the driving control apparatus for a vehicle may obtain a current total payload of the vehicle through a payload sensor or a barometric sensor.

Step 2005. Calculate an average payload of the vehicle according to the total payload of the vehicle.

As a possible implementation of Embodiment 11 of the present disclosure, when the vehicle includes two carriages, that is, the vehicle includes a first carriage and a second carriage, the driving control apparatus for a vehicle may obtain a payload $M^1$ of the first carriage and a payload $M^2$ of the second carriage through the payload sensor or the barometric sensor, and obtain the average payload of the vehicle by averaging, namely, $M_j=(M_1+M_2)/2$.

Step 2006. Calculate a payload allocated to each carriage according to the SOC value of the power battery corresponding to each carriage, the SOC average value of the power batteries, and the average payload of the vehicle.

In this embodiment of the present disclosure, in response to that $S_a-S_j \geq S_y$, the payload allocated to each carriage is calculated according to a fifth formula, and the fifth formula is: $M_a=K \cdot M_j \cdot S_a/S_j$; and in response to that $S_a-S_j<S_y$, the payload allocated to each carriage is calculated according to a sixth formula, and the sixth formula is: $M_a=M_j \cdot S_a/S_j$, where, $M_a$ is a payload allocated to an $a^{th}$ carriage, K is an allocation coefficient, $M_j$ is the average payload of the vehicle, $S_a$ is an SOC value of a power battery of the $a^{th}$ carriage, $S_j$ is the SOC average value of the power batteries of the vehicle, and $S_y$ is a battery level threshold. The allocation coefficient K is not a fixed value, and K≥1, which can be modified according to a running condition of the vehicle, and be generally set to 1.1 or 1.2. By changing the allocation coefficient K, a speed at which a battery level of the power battery of each carriage reaches the balanced state can be controlled.

In this embodiment of the present disclosure, the driving control apparatus for a vehicle may obtain the current total payload of the vehicle through the payload sensor or the barometric sensor, and calculate the average payload of the vehicle according to the current total payload of the vehicle. The driving control apparatus for a vehicle calculates the payload allocated to each carriage according to the average payload of the vehicle, the SOC value of the power battery corresponding to each carriage, and the SOC average value of the power batteries. It can be seen from the driving control method for a vehicle that, the larger a payload allocated to a carriage with a larger SOC value of a power battery is, the faster battery level consumption of the power battery corresponding to the carriage is. In this way, the battery level of the power battery of each carriage is in the balanced state.

It is to be noted that, in response to that a calculated value of a payload allocated to a carriage is less than a first payload value, a value of the payload allocated to the carriage is set to the first payload value; and in response to that a calculated value of a payload allocated to a carriage is greater than a second payload value, a value of the payload allocated to the carriage is set to the second payload value, and the first payload value is greater than the second payload value. The first payload value and the second payload value may be determined according to an actual running condition of the vehicle.

Step 2007. Obtain an output torque of each carriage according to the level allocated to each carriage and the payload allocated to each carriage.

In this embodiment of the present disclosure, the output torque of each carriage may be calculated according to a seventh formula, and the seventh formula is: $T_a=((M_a+m) \cdot 1000 \cdot K_d \cdot X_a + M_a \cdot g \cdot w) \cdot R/(\eta \cdot i)$, where, $T_a$ is an output torque of an $a^{th}$ carriage, $M_a$ is a payload allocated to the $a^{th}$ carriage, m is a rotating mass, $K_d$ is an equivalent acceleration, $X_a$ is a level allocated to the $a^{th}$ carriage, g is an acceleration of gravity, w is unit basic resistance, R is a tire radius of the vehicle, η is efficiency of a reducer, and i is a speed reduction ratio.

In this embodiment of the present disclosure, battery level information of a power battery corresponding to each of carriages is obtained, so that different levels are allocated to different carriages, and then each carriage outputs a different torque. That is, after battery level information of power batteries of all carriages of a vehicle is mastered, a carriage with a high battery level or a low battery level is identified, and then a level is allocated to each carriage accordingly, to control each carriage to output a different torque. In other words, by adjusting battery level consumption of the power battery corresponding to each carriage, a battery level of the power battery corresponding to each carriage being the same or similar is finally achieved. In this way, after the vehicle runs for a long time, a problem that a battery level of the vehicle is insufficient to meet driving requirements of the vehicle because battery levels of power batteries in different carriages are inconsistent, and a power battery with a lower battery level cannot provide an enough battery level to an apparatus in a corresponding carriage is effectively avoided.

Embodiment 12

Figure 12:
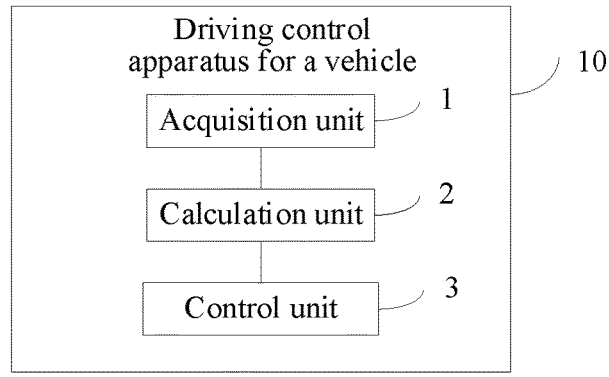
FIG. 12 is a schematic diagram of a driving control apparatus for a vehicle according to Embodiment 12 of the present disclosure.

FIG. 12 is a schematic diagram of a driving control apparatus for a vehicle according to Embodiment 12 of the present disclosure. As shown in FIG. 12, the driving control apparatus 10 for a vehicle includes:

an acquisition unit 1, configured to obtain battery level information of a power battery corresponding to each of carriages; a calculation unit 2, configured to obtain at least one of a level allocated to each carriage or a payload allocated to each carriage according to the battery level information of the power battery corresponding to each carriage; and a control unit 3, configured to obtain an output torque of each carriage according to the at least one of the level allocated to each carriage or the payload allocated to each carriage. It is to be noted that, the vehicle only includes two carriages.

The driving control apparatus for a vehicle of this embodiment of the present disclosure reasonably allocates at least one of a level or a payload of each of carriages by obtaining battery level information of a power battery corresponding to each carriage, so that each carriage outputs a different torque. In other words, by adjusting battery level consumption of the power battery of each carriage, it is ensured that a battery level of the power battery of each carriage remains balanced.

Embodiment 13

Figure 13:
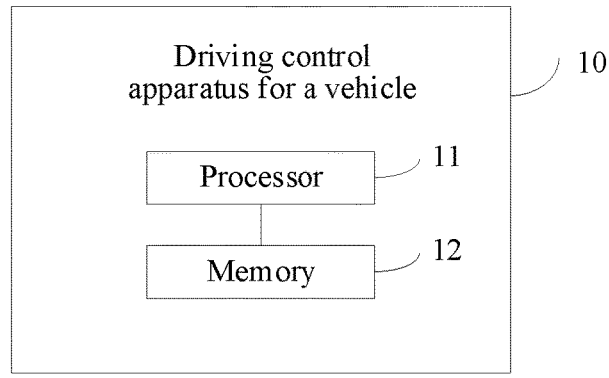
FIG. 13 is a schematic diagram of a driving control apparatus for a vehicle according to Embodiment 13 of the present disclosure.

FIG. 13 is a schematic diagram of a driving control apparatus for a vehicle according to Embodiment 13 of the present disclosure. As shown in FIG. 13, the driving control apparatus 10 for a vehicle includes:

a processor 11 and a memory 12, the processor 11 being configured to read an executable program code stored in the memory 12, and run a program corresponding to the executable program code, to implement the driving control method for a vehicle according to the foregoing embodiments.

Figure 14:
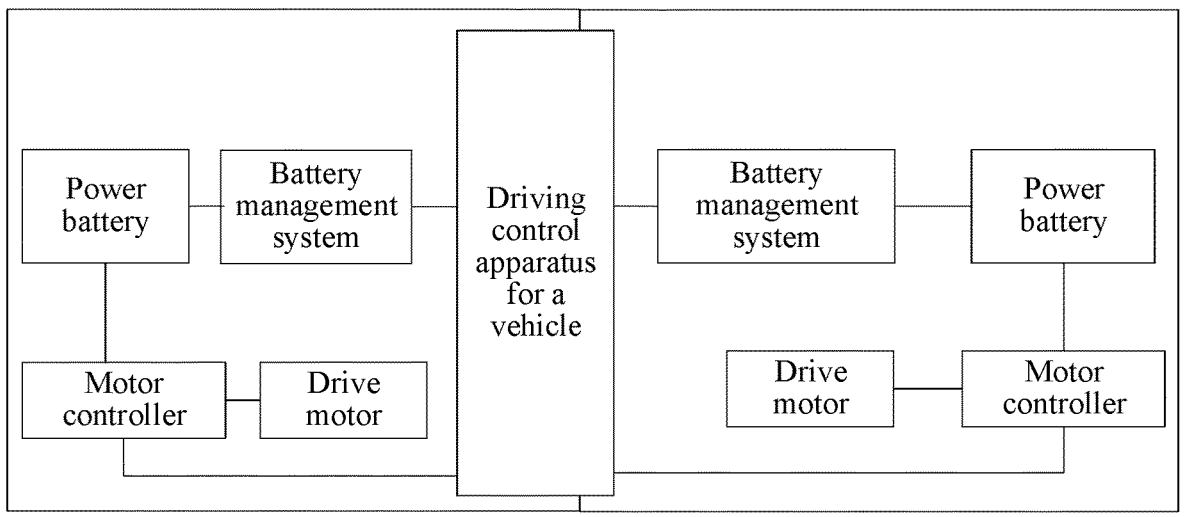
FIG. 14 is a schematic diagram of a vehicle according to an embodiment of the present disclosure.

To achieve the foregoing embodiments, this application further proposes a vehicle. As shown in FIG. 14, in this embodiment of the present disclosure, the vehicle includes a driving control apparatus for a vehicle and two carriages, and each of the carriages includes: a power batter; a battery management system, connected to the power battery; a motor controller, connected to the power battery; and a drive motor, connected to the motor controller, where the driving control apparatus for a vehicle is respectively connected to the battery management system and the motor controller, and the driving control apparatus for a vehicle is the driving control apparatus for a vehicle according to the foregoing aspect.

The vehicle of this embodiment of the present disclosure reasonably allocates at least one of a level or a payload of each of carriages by obtaining battery level information of a power battery corresponding to each carriage, so that each carriage outputs a different torque. In other words, by adjusting battery level consumption of the power battery of each carriage, it is ensured that a battery level of the power battery of each carriage remains balanced.

To achieve the foregoing embodiments, this application further proposes a non-transitory computer-readable storage medium.

The computer readable storage medium stores a computer program, and when executed by a processor, the program implements the driving control method for a vehicle according to the foregoing embodiments.

In an optional implementation, this embodiment may use any combination of one or more computer-readable media. The computer-readable medium may be a computer-readable signal medium or a computer-readable storage medium. The computer-readable storage medium may be, for example, but is not limited to, an electric, magnetic, optical, electromagnetic, infrared, or semi-conductive system, apparatus, or component, or any combination thereof. More specific examples of the computer-readable storage medium (a non-exhaustive list) include: an electrical connection having one or more wires, a portable computer disk, a hard disk, a RAM, a ROM, an erasable programmable ROM (EPROM or a flash memory), an optical fiber, a CD-ROM, an optical storage device, a magnetic storage device, or any appropriate combination thereof. In this application, the computer-readable storage medium may be any tangible medium including or storing a program, and the program may be used by or used in combination with an instruction execution system, an apparatus, or a device.

The computer-readable signal medium may include a data signal being in a baseband or propagated as a part of a carrier, the data signal carrying computer-readable program code. The propagated data signal may be in a plurality of forms, including but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device.

The program code contained in the computer-readable medium may be transmitted by using any appropriate medium, including but not limited to: a wireless medium, a wire, an optical cable, RF, any suitable combination of the above, or the like.

One or more programming languages or any combination thereof may be used to write the computer program code used for performing the operations in this application. The programming languages include, but are not limited to an object oriented programming language such as Java, Smalltalk, C++, or the like and a conventional procedural programming language, such as the C programming language or a similar programming language. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a computer of a user through any type of network including a local area network (LAN) or a wide area network (WAN), or may be connected to an external computer (for example, through the Internet by using an Internet service provider).

To achieve the foregoing embodiments, this application further proposes a computer program product. When executed by a processor, the computer program product implements the driving control method for a vehicle according to the foregoing embodiments.

To achieve the foregoing embodiments, this application further proposes a computer device, including: a processor and a memory, the processor being configured to read an executable program code stored in the memory, and run a program corresponding to the executable program code, to implement the driving control method for a vehicle according to the foregoing embodiments.

In this application, unless otherwise explicitly specified or defined, the terms such as "dispose", and "connect" should be understood in a broad sense. For example, the connection may be a mechanical connection, or an electrical connection; or the connection may be a direct connection, an indirect connection through an intermediary, or internal communication between two elements or mutual action relationship between two elements, unless otherwise specified explicitly. A person of ordinary skill in the art may understand the specific meanings of the foregoing terms in this application according to specific situations.

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of this application.

In addition, the terms "first" and "second" are used for descriptive purposes only and are not to be construed as indicating or implying relative importance or implicitly indicating the number of technical features indicated. Therefore, features defining "first" and "second" can explicitly or implicitly include at least one of the features.

Any process or method in the flowcharts or described herein in another manner may be understood as indicating a module, a segment, or a part including code of one or more executable instructions for implementing a particular logical function or process step. In addition, the scope of preferred embodiments of this application includes other implementations which do not follow the order shown or discussed, including performing, according to involved functions, the functions basically simultaneously or in a reverse order, which should be understood by technical personnel in the technical field to which the embodiments of this application belong.

It should be understood that, each part of this application can be implemented by hardware, software, firmware or a combination thereof. In the foregoing implementations, a plurality of steps or methods may be implemented by using software or firmware that are stored in a memory and are executed by a proper instruction execution system. For example, if being implemented by hardware, like another implementation, the plurality of steps or methods may be implemented by any one of following common technologies in the art or a combination thereof: a discrete logic circuit of a logic gate circuit for realizing a logic function for a data signal, an application specific integrated circuit having a suitable combined logic gate circuit, a programmable gate array (PGA), and a field programmable gate array (FPGA).

A person of ordinary skill in the art may understand that all or some of the steps of the methods in the foregoing embodiments may be implemented by a program instructing relevant hardware. The program may be stored in a computer-readable storage medium. When the program is executed, one or a combination of the steps of the method embodiments are performed.

The storage medium mentioned above may be a read-only memory, a magnetic disk, an optical disc, or the like. Although the embodiments of this application are shown and described above, it may be understood that the foregoing embodiments are examples, and cannot be understood as limitations to this application. A person of ordinary skill in the art may make changes, modifications, replacements, and variations to the foregoing embodiments without departing from the scope of this application.

What is claimed is:

1. A driving control method for a vehicle, the vehicle comprising at least two carriages, and the driving control method comprising, when the vehicle is traveling:
    obtaining, by a vehicle controller in real time communication with a power battery corresponding to each carriage of the at least two carriages, battery level information of the power battery corresponding to each carriage of the at least two carriages;
    obtaining, by the vehicle controller, a level of traction applied to the vehicle allocated to each carriage according to the battery level information of the power battery corresponding to each carriage, by:
        in response to that $S_a-S_i>S_y$, calculating the level of traction applied to the vehicle allocated to each carriage according to a first formula: $X_a=K \cdot X \cdot S_a/S_i$; and
        in response to that $S_a-S_i<S_y$, calculating the level of traction applied to the vehicle allocated to each carriage according to a second formula $X_a=X \cdot S_a/S_i$,
        where $X_a$ is a level of traction applied to the vehicle allocated to an $a^{th}$ carriage, K is an allocation coefficient, X is a current level of traction applied to the vehicle, $S_a$ is a state of charge (SOC) value of a power battery of the $a^{th}$ carriage, $S_j$ is an SOC average value of power batteries of the vehicle, and $S_y$ is a battery level threshold;
    transmitting in real time, by the vehicle controller, to each motor controller of each carriage, the level of traction applied to the vehicle allocated to each carriage;
    obtaining, by each motor controller, an output torque of each carriage according to the level of traction applied to the vehicle allocated to each carriage, wherein an output torque of a first carriage with a first battery level is greater than an output torque of a second carriage with a second battery level lower than the first battery level; and
    applying, by each motor controller, the output torque to each motor of each carriage such that the first battery level becomes similar to or same as the second battery level.

2. The method according to claim 1, wherein
    the battery level information of the power battery corresponding to each carriage comprises an SOC value of the power battery corresponding to each carriage, and the obtaining the level of traction applied to the vehicle allocated to each carriage according to the battery level information of the power battery corresponding to each carriage comprises:
  calculating the level of traction applied to the vehicle allocated to each carriage according to the SOC value of the power battery corresponding to each carriage and the current level of traction applied to the vehicle.

3. The method according to claim 2, further comprising:
  obtaining the current level of traction applied to the vehicle through a driver console of the vehicle.

4. The method according to claim 1, wherein the calculating the level of traction applied to the vehicle allocated to each carriage according to an SOC value of the power battery corresponding to each carriage and the current level of traction applied to the vehicle comprises:
  calculating the level of traction applied to the vehicle allocated to each carriage according to a third formula, the third formula being:

$$X_a = K \cdot X \cdot A \cdot S_a/(S_1+S_2+ \ldots +S_n),$$

wherein, A is a quantity of carriages, $S_1$ is an SOC value of a power battery of the first carriage, $S_2$ is an SOC value of a power battery of the second carriage, and $S_n$ is an SOC value of a power battery of an $n^{th}$ carriage.

5. The method according to claim 4, wherein in response to that a calculated value of a first level of traction applied to the vehicle allocated to the first carriage based on the third formula is greater than a level threshold, a value of the first level of traction applied to the vehicle allocated to the first carriage is set to be equal to the level threshold.

6. The method according to claim 1, wherein
  the battery level information of the power battery corresponding to each carriage comprises an SOC value of the power battery corresponding to each carriage, and
  the obtaining the level of traction applied to the vehicle allocated to each carriage according to the battery level information of the power battery corresponding to each carriage comprises:
    calculating the SOC average value of power batteries of the vehicle according to the SOC value of the power battery corresponding to each carriage; and
    calculating the level of traction applied to the vehicle allocated to each carriage according to the SOC value of the power battery corresponding to each carriage, the SOC average value of the power batteries of the vehicle, and the current level of traction applied to the vehicle.

7. The method according to claim 1, wherein
  the battery level information of the power battery corresponding to each carriage comprises an SOC value of the power battery corresponding to each carriage, and
  the method further comprises:
  obtaining a payload allocated to each carriage according to the battery level information of the power battery corresponding to each carriage, by:
    calculating the payload allocated to each carriage according to the SOC value of the power battery corresponding to each carriage and a current total payload of the vehicle.

8. The method according to claim 7, wherein the calculating the payload allocated to each carriage according to the SOC value of the power battery corresponding to each carriage and the current total payload of the vehicle comprises:
  calculating the payload allocated to each carriage according to a fourth formula, the fourth formula being:

$$M_a = K \cdot M \cdot S_a/(S_1+S_2+ \ldots +S_n),$$

wherein, $M_a$ is a payload allocated to the $a^{th}$ carriage, M is the current total payload of the vehicle, $S_1$ is an SOC value of a power battery of the first carriage, $S_2$ is an SOC value of a power battery of the second carriage, and $S_n$ is an SOC value of a power battery of an $n^{th}$ carriage.

9. The method according to claim 8, wherein in response to that a calculated value of a second payload allocated to the second carriage based on the fourth formula is less than a first payload value, a value of the second payload allocated to the second carriage is set to be equal to the first payload value.

10. The method according to claim 9, wherein in response to that the calculated value of the second payload allocated to the second carriage is greater than a third payload value, the value of the second payload allocated to the second carriage is set to be equal to the third payload value, and the first payload value is greater than the third payload value.

11. The method according to claim 7, further comprising:
  obtaining the current total payload of the vehicle through a payload sensor or a barometric sensor.

12. The method according to claim 1, wherein
  the battery level information of the power battery corresponding to each carriage comprises an SOC value of the power battery corresponding to each carriage, and
  the method further comprises:
  obtaining a payload allocated to each carriage according to the battery level information of the power battery corresponding to each carriage, by:
    calculating the SOC average value of power batteries of the vehicle according to the SOC value of the power battery corresponding to each carriage;
    obtaining a current total payload of the vehicle;
    calculating an average payload of the vehicle according to the current total payload of the vehicle; and
    calculating the payload allocated to each carriage according to the SOC value of the power battery corresponding to each carriage, the SOC average value of the power batteries, and the average payload of the vehicle.

13. The method according to claim 12, wherein the calculating the payload allocated to each carriage according to the SOC value of the power battery corresponding to each carriage, the SOC average value of the power batteries, and the average payload of the vehicle comprises:
  in response to that $S_a-S_j>S_y$, calculating the payload allocated to each carriage according to a fifth formula, the fifth formula being:

$$M_a = K \cdot M_j \cdot S_a/S_j;\text{ and}$$

in response to that $S_a-S_j<S_y$, calculating the payload allocated to each carriage according to a sixth formula, the sixth formula being:

$$M_a = M_j \cdot S_a/S_j,$$

wherein, $M_a$ is a payload allocated to the $a^{th}$ carriage, and $M_j$ is the average payload of the vehicle.

14. The method according to claim 13, wherein in response to that a calculated value of a second payload allocated to the second carriage based on the fifth formula is less than a first payload value, a value of the second payload allocated to the second carriage is set to be equal to the first payload value.

15. The method according to claim 14, wherein in response to that the calculated value of the second payload allocated to the second carriage is greater than a third payload value, the value of the second payload allocated to the second carriage is set to be equal to the third payload value, and the first payload value is greater than the third payload value.

16. The method according to claim 1, wherein the obtaining the output torque of each carriage according to the level of traction applied to the vehicle allocated to each carriage comprises:
   obtaining the output torque of each carriage according to the level of traction applied to the vehicle allocated to each carriage and a payload allocated to each carriage, by:
      calculating the output torque of each carriage according to a seventh formula, the seventh formula being:

$$T_a = ((M_a + m) \cdot 1000 \cdot K_d \cdot X_a + M_a \cdot g \cdot w) \cdot R / (\eta \cdot i),$$

wherein, $T_a$ is an output torque of the $a^{th}$ carriage, $M_a$ is a payload allocated to the $a^{th}$ carriage, m is a rotating mass, $K_d$ is an equivalent acceleration, g is an acceleration of gravity, w is unit basic resistance, R is a tire radius of the vehicle, $\eta$ is efficiency of a reducer, and i is a speed reduction ratio.

17. The method according to claim 1, wherein the obtaining battery level information of the power battery corresponding to each carriage comprises:
   obtaining the battery level information of the power battery corresponding to each carriage through a battery management system of each carriage.

18. A driving control apparatus for a vehicle, comprising: a processor and a memory,
   the vehicle comprising at least two carriages, and the processor being configured to read an executable program code stored in the memory, run a program corresponding to the executable program code, and when the vehicle is traveling, perform operations comprising:
      obtaining in real time battery level information of a power battery corresponding to each carriage of the at least two carriages;
      obtaining a level of traction applied to the vehicle allocated to each carriage according to the battery level information of the power battery corresponding to each carriage, by:
         in response to that $S_a - S_j > S_y$, calculating the level of traction applied to the vehicle allocated to each carriage according to a first formula: $X_a = K \cdot X \cdot S_a / S_j$; and
         in response to that $S_a - S_j < S_y$, calculating the level of traction applied to the vehicle allocated to each carriage according to a second formula $X_a = X \cdot S_a / S_j$,
         where $X_a$ is a level of traction applied to the vehicle allocated to an $a^{th}$ carriage, K is an allocation coefficient, X is a current level of traction applied to the vehicle, $S_a$ is a state of charge (SOC) value of a power battery of the $a^{th}$ carriage, $S_j$ is an SOC average value of power batteries of the vehicle, and $S_y$ is a battery level threshold;
      transmitting in real time to each motor controller of each carriage, the level of traction applied to the vehicle allocated to each carriage;
      obtaining an output torque of each carriage according to the level of traction applied to the vehicle allocated to each carriage, wherein an output torque of a first carriage with a first battery level is greater than an output torque of a second carriage with a second battery level lower than the first battery level; and
      applying, by each motor controller, the output torque to each motor of each carriage such that the first battery level becomes similar to or same as the second battery level.

19. A vehicle, comprising a driving control apparatus for the vehicle and at least two carriages, wherein each carriage comprises:
   a power battery;
   a battery management system, connected to the power battery;
   a motor controller, connected to the power battery; and
   a drive motor, connected to the motor controller, wherein:
   the driving control apparatus is connected to the battery management system and the motor controller, and is configured to perform, when the vehicle is traveling, operations comprising:
      obtaining in real time battery level information of a power battery corresponding to each carriage of the at least two carriages;
      obtaining a level of traction applied to the vehicle allocated to each carriage according to the battery level information of the power battery corresponding to each carriage, by:
         in response to that $S_a - S_j \geq S_y$, calculating the level of traction applied to the vehicle allocated to each carriage according to a first formula: $X_a = K \cdot X \cdot S_a / S_j$; and
         in response to that $S_a - S_j < S_y$, calculating the level of traction applied to the vehicle allocated to each carriage according to a second formula $X_a = X \cdot S_a / S_j$,
         where $X_a$ is a level of traction applied to the vehicle allocated to an $a^{th}$ carriage, K is an allocation coefficient, X is a current level of traction applied to the vehicle, Sa is a state of charge (SOC) value of a power battery of the $a^{th}$ carriage, $S_j$ is an SOC average value of power batteries of the vehicle, and $S_y$ is a battery level threshold; and
      transmitting in real time to each motor controller of each carriage, the level of traction applied to the vehicle allocated to each carriage, and
   wherein each motor controller is configured to:
      obtain an output torque of each carriage according to the level of traction applied to the vehicle allocated to each carriage, wherein an output torque of a first carriage with a first battery level is greater than an output torque of a second carriage with a second battery level lower than the first battery level; and
      apply the output torque to each motor of each carriage such that the first battery level becomes similar to or same as the second battery level.

* * * * *